United States Patent
Morlat et al.

(10) Patent No.: US 9,208,273 B1
(45) Date of Patent: Dec. 8, 2015

(54) METHODS, SYSTEMS, AND ARTICLES OF MANUFACTURE FOR IMPLEMENTING CLONE DESIGN COMPONENTS IN AN ELECTRONIC DESIGN

(71) Applicant: Cadence Design Systems, Inc., San Jose, CA (US)

(72) Inventors: Fabrice Raymond Morlat, Montbard (FR); Gerard Tarroux, Villeneuve-Loubet (FR); Fabien Campana, Les Adrets de l'Esterel (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/503,409

(22) Filed: Oct. 1, 2014

(51) Int. Cl.
*G06F 17/50* (2006.01)

(52) U.S. Cl.
CPC .......... *G06F 17/505* (2013.01); *G06F 2217/06* (2013.01)

(58) Field of Classification Search
CPC .................................................. G06F 17/5045
USPC ........................................................ 716/104
See application file for complete search history.

(56) References Cited

U.S. PATENT DOCUMENTS

| | | |
|---|---|---|
| 5,537,580 A | 7/1996 | Giomi et al. |
| 5,805,462 A | 9/1998 | Poirot et al. |
| 6,397,370 B1 | 5/2002 | Fernandez et al. |
| 7,555,739 B1 | 6/2009 | Ginetti et al. |
| 7,571,411 B2 * | 8/2009 | Hentschke et al. ........... 716/126 |
| 8,347,261 B2 | 1/2013 | Ginetti et al. |
| 8,527,934 B2 | 9/2013 | Ginetti et al. |
| 2007/0240091 A1* | 10/2007 | Vujkovic et al. ................ 716/13 |
| 2011/0061034 A1 | 3/2011 | Ginetti et al. |
| 2013/0097572 A1 | 4/2013 | Ginetti et al. |
| 2013/0283225 A1* | 10/2013 | Alpert et al. .................. 716/122 |

OTHER PUBLICATIONS

Ditzel, et al. "Experience with CAD Tools for the AT&T CRISP Microprocessor" AT&T Bell Laboratories Murray Hill, New Jersey (19 pages).
Kao, et al. "Design Notes for Electric's Network Consistency Checker", Jan. 2006, Sun Microsystems, SMLI TR-2006-152 (126 pages).

* cited by examiner

*Primary Examiner* — Suresh Memula
(74) *Attorney, Agent, or Firm* — Vista IP Law Group, LLP

(57) ABSTRACT

Various embodiments implement electronic designs with cloning techniques by identifying a root device corresponding to a master design in an electronic design, performing one or more sets of searches for device correspondence with respect to the root device, and implementing the electronic design by at least characterizing the device correspondence based at least in part upon one or more criterion for the one or more sets of searches. These techniques implement the electronic design by characterizing the device correspondence through at least determining whether the device correspondence represents a clone, a mutant, or a user clone and by identifying and replicating clones, mutants, and/or user clones in the electronic design.

20 Claims, 20 Drawing Sheets

METHODS, SYSTEMS, AND ARTICLES OF MANUFACTURE FOR IMPLEMENTING CLONE DESIGN COMPONENTS IN AN ELECTRONIC DESIGN

BACKGROUND

Modern electronic designs often include various library cells such as some off-the-shelf use configurable or non-configurable intellectual property (IP) cells, macro cells, etc. to save development efforts and to expedite the design cycles so as to shorten the time-to-market of the eventual products. In addition, a certain portion such as a cell or a block of circuit components of an electronic design is often replicated by using cloning techniques to identify or generate multiple instances or copies that are identical to or similar to the portion in the electronic design. Replication of a portion of an electronic design or cloning the portion of the electronic design may include the first process that generates one or more exact replications or clones of the portion in one or more other areas of the electronic design. Replication of a portion of an electronic design or cloning the portion of the electronic design may also include the second process that generates one or more mutants of the portion in one or more areas of the electronic design. Conventional approaches for cloning utilize connectivity search processes to identity clone targets or mutant targets.

There are basically four issues with the conventional connectivity search processes. The first issue is that connectivity search processes are slow, especially when the design size or complexity increases. One purpose of a connectivity search process is to find target sub-graphs (e.g., a set of schematic devices) similar to the clone source sub-graph. These conventional search processes rely only on the device connectivity. Both the conventional clone and mutant connectivity search processes are known to be slow, especially when the size or complexity of the sub-graph and the size or complexity of the whole graph grow. The second issue is that the quality of the results is low for some clone topologies. The third issue is that the quality of result is often low for conventional mutant connectivity searches. The fourth issue is that search processes may only perform on a set of connected devices.

Therefore, there is a need for a method and a system for implementing electronic designs with cloning techniques without having the aforementioned issues, disadvantages, or problems.

SUMMARY

Disclosed are method(s), system(s), and article(s) of manufacture for implementing electronic designs with cloning techniques in one or more embodiments. Some embodiments are directed at a method for implementing electronic designs with cloning techniques. The method includes the acts of identifying a root device corresponding to a master design in an electronic design, performing one or more sets of searches for device correspondence with respect to the root device, and implementing the electronic design by at least characterizing the device correspondence based at least in part upon one or more criterion for the one or more sets of searches.

In some of these embodiments, the method implements the electronic design by at least characterizing the device correspondence, and the act of characterizing the device corresponding comprises determining whether the device correspondence represents a clone, a mutant, or a user clone. In addition or in the alternative, the method may further include the acts of identifying one or more master designs in the electronic design, identifying the master design from the one or more master designs based at least in part upon one or more factors including a number of occurrences of the master design in the electronic design, and identifying a plurality of devices that correspond to the master design as a plurality of potential root devices.

In some of these immediately preceding embodiments, the method may further include the acts of identifying a potential root device from the plurality of potential root devices as the root device, and identifying a set of bounding boxes for the root device at clone source locations. In some embodiments, the method may further include the acts of identifying one or more target devices that are similar to the root device as one or more target root devices, identifying a target root device from the one or more target root devices, and determining a corresponding set of target bounding boxes for the target root device. In some of the preceding embodiments, the method that determines the corresponding set of target bounding boxes for the target root device may further perform a transformation on the set of bounding boxes for the root device from the root device to the target root device, and determine the corresponding set of target bounding boxes based at least in part upon one or more sizes of the set of bounding boxes and the transformation.

In addition or in the alternative, the method may further include the acts of identifying a first set of searches from the one or more searches, and performing the first set of searches on the corresponding set of bounding boxes for the target root device for the device correspondence. In some embodiments, the method may include the acts of determining whether a first set of searches of the one or more returns sufficient information to determine the device correspondence, and identifying one or more next sets of searches based at least in part upon the first set of searches, wherein the first set of searches does not return the sufficient information to determine the device correspondence.

In some of the immediately preceding embodiments where the method identifies the one or more next sets of searches, the method may further include the acts of identifying search locations for the first set of searches for a target root device, performing one or more transformations on the search locations with respect to the target root device, and determining the one or more next sets of searches based at least in part upon respective results of performing the one or more transformations. In some embodiments, the method may further include the acts of determining whether the one or more sets of searches return sufficient information for the device correspondence, and performing one or more additional sets of searches for the device correspondence with respect to the root device when the one or more sets of searches fails to return the sufficient information for the device correspondence.

In addition or in the alternative, the method may further includes the acts of identifying a first target root device with respect to which the one or more searches are performed, determining whether the one or more sets of searches performed for the first target root device return sufficient information for the device correspondence, and identifying a second target root device for the one or more sets of searches. The method may optionally include the acts of identifying the device correspondence between the root device and a target root device from results of performing the one or more sets of searches, and determining whether the device correspondence represents a clone, a mutant, or a user clone.

Additionally or alternatively, the method may further identify one or more options for connectivity, and perform connectivity check to determine whether the device correspondence is to be accepted or rejected. In some embodiments, the one or more criterion includes whether the one or more sets of searches are to identify a clone, a mutant, or a user clone. In addition or in the alternative, the method may implement the electronic design by at least identifying or replicating a clone source including the root device as the clone, the mutant, or the user clone, without performing connectivity search.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
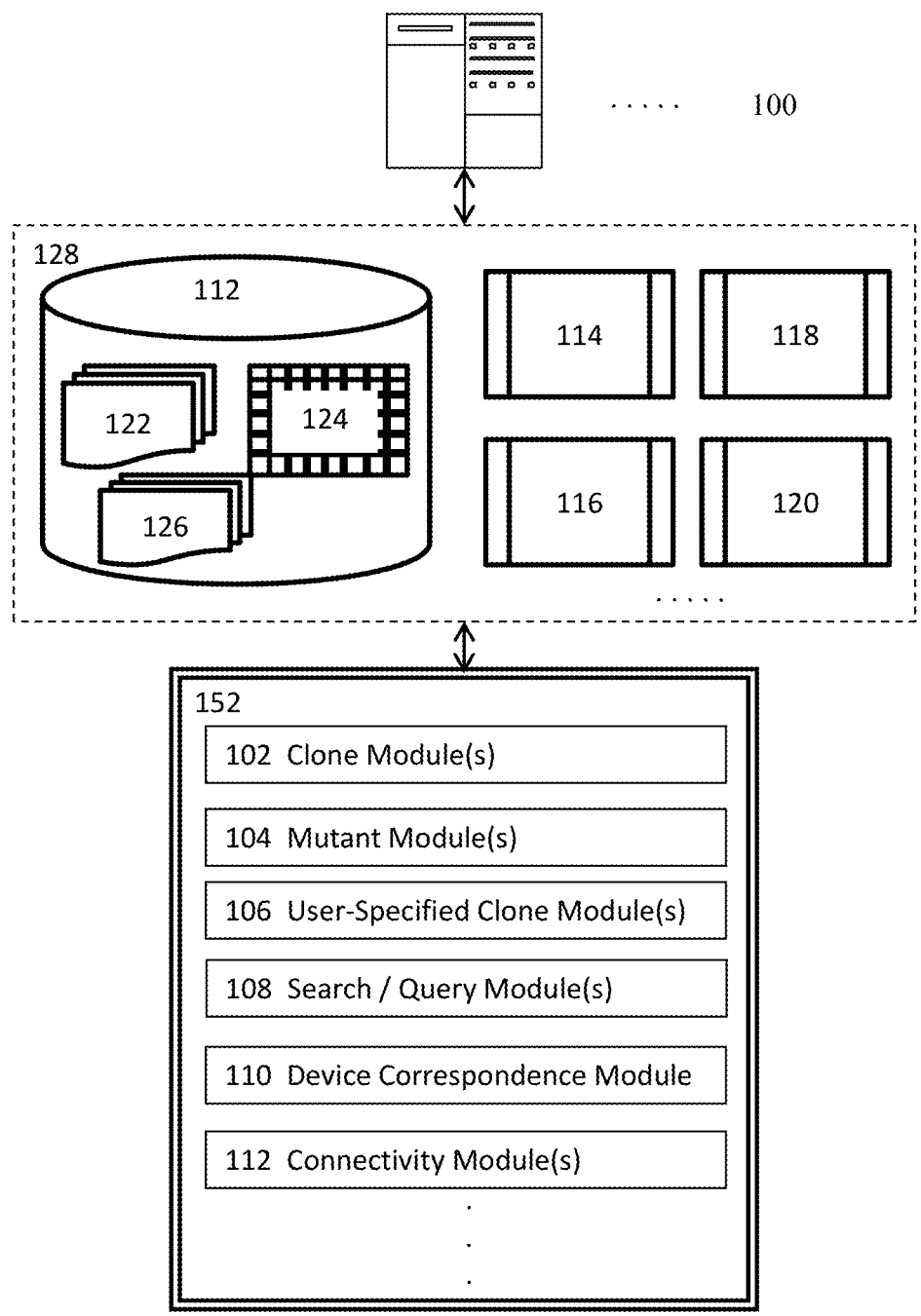
FIG. 1 illustrates a high level block diagram of a system for implementing electronic designs with cloning techniques in some embodiments.

Various embodiments of the invention are directed to a methods, systems, and articles of manufacture for implementing electronic designs with cloning techniques. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Various embodiments are directed at implementing clone and mutant design components in an electronic design. Various techniques for implementation of clone and mutant design components, the clone connectivity search process, and the mutant connectivity search process described herein are efficient, fast, and scalable as the size or complexity of an electronic design increases. In addition, the built-in fuzziness of these search processes to identify approximate matches greatly improves the quality of clone and mutant search results over conventional approaches because the clone search process and the mutant search process is connectivity based, the search processes may identify different results than the one expected by user, and the clone search and mutant search processes identify clones and mutants from a set of devices even when some or all of these devices are not connected.

Cloning includes one or more exact or approximate replications of a certain portion such as a cell or a block of circuit components of an electronic design (e.g., a schematic design or a layout) in the electronic design. The portion may include a layout clone source, which includes a set of layout instances in the layout domain or schematic instances in the schematic domain and is to be replicated, and a schematic clone source, which includes a set of devices in the schematic domain and is to be replicated. The portion may also include a schematic clone target which includes a set of devices in the schematic domain that is not yet bound to layout instances and is interconnected in the same manner as the schematic clone source. The portion may also include a layout mutant target, which is a set of devices similar to those corresponding to the schematic clone source but whose interconnections are different from the schematic clone source to an extent that falls within a prescribed threshold or limit. In some embodiments, two set of schematic devices (sub-graphs) are considered as clones of each other if the devices from the source and the target are inter-connected the same way.

In some embodiments, cloning includes the ability to replicate a section of a layout, associated with a section of the corresponding schematic, in such a way that the new piece of layout material may be placed at more than one location. A layout clone source includes a set of layout instances and shapes that are to be replicated in one or more other portions of the layout. A schematic clone source includes a set of schematic devices bound to the corresponding layout clone source instances. A schematic clone target includes a set of devices not yet bound to the corresponding layout instances and inter-connected in the same way as the schematic clone source. A schematic mutant target includes a set of devices similar to the schematic clone source but whose interconnections are slightly different as permitted by, for example, a limit or a threshold. The clone "connectivity search" process includes an algorithm used to identify the schematic clone targets. A mutant "connectivity search" process may be used to identify one or more schematic mutant targets. In some embodiments, the mutant connectivity search process may be parameterized to find targets with less than "n" connectivity differences between the set of target devices and the clone source set of devices.

Disclosed are method(s), system(s), and article(s) of manufacture for implementing additional connectivity for electronic designs in one or more embodiments. Various details of any of the processes, sub-processes, or acts are further provided below with reference to respective drawing figures. FIG. 1 illustrates a high level block diagram for a method or a system for implementing electronic designs with cloning techniques in some embodiments. In one or more embodiments, the system for implementing additional connectivity for electronic designs may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a global routing engine, a conduit routing engine (also referred to as G-routing engine or corridor routing engine), and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), libraries, data, rule decks, constraints, etc. (122), or other information or data (126) that may be used to facilitate the performance of various functions to achieve the intended purposes.

In some embodiments, conduit-routing is performed between the global and detail routing stages to coordinate assignment for routes that cross one or more cell boundaries which are defined during the global routing stage. In these embodiments, the conduit-routing may determine the major part of a route which crosses multiple cells while leaving mostly short connections within a cell to be routed by the detail router. Conduit routing is distinguishable from channel routing which identifies and defines a channel to be the space along an edge between two wires and determines the possibility or capacity of running one or more wires through the identified channel.

In some embodiments, the one or more computing systems 100 may, either directly or indirectly through various resources 128, invoke various software, hardware modules or combinations thereof 152 that may comprises one or more clone modules 102 to generate, modify, identify, or otherwise manipulate clones, one or more mutant modules 104 to generate, modify, identify, or otherwise manipulate mutants, one or more user-specified clone modules 106 to generate, modify, identify, or otherwise manipulate use-specified clones either alone or jointly with one or more other modules such as the one or more modules 102 and/or the one or more modules 104 described above, and one or more search or query modules 108 to identify, determine, or perform one or more sets of searches or queries for device correspondence between two devices. The various software, hardware modules or combinations thereof 152 may further include one or more device correspondence modules 110 to identify or determine whether device correspondence between two devices may be identified alone or in conjunction with one or more other modules such as one or more search or query modules 108 or to identify or establish correspondence between a schematic device and its corresponding layout shapes. In addition, the various software, hardware modules or combinations thereof 152 may include one or more connectivity modules 150 that perform various operation for or on connectivity such as identifying connectivity of a device, identifying connectivity differences of two devices, or any other operations or functions for or on connectivity of one or more devices, etc.

In some embodiments, cloning includes the identification or generation of one or more exact or approximate replications of a certain portion such as a cell or a block of circuit components of an electronic design (e.g., a schematic design or a layout) in the electronic design. The portion may include a layout clone source, which includes a set of layout instances in the layout domain and is to be replicated or has been replicated and is to be identified as such, and a schematic clone source, which includes a set of devices in the schematic domain and is to be replicated or has been replicated and is to be identified as such.

The portion may also include a schematic clone target which includes a set of device in the schematic domain that is not yet bound to layout instances and is interconnected in the same manner as the schematic clone source. A clone may also include a layout mutant target, which is a set of devices similar to the schematic clone source but whose interconnections are different from the schematic clone source to an extent within a prescribed threshold. In some embodiments, a user-specified clone or a user clone that includes a set of unconnected schematic devices or layout shapes. A user clone may also include a set of mutants having no more than n-connectivity differences.

Figure 1A:
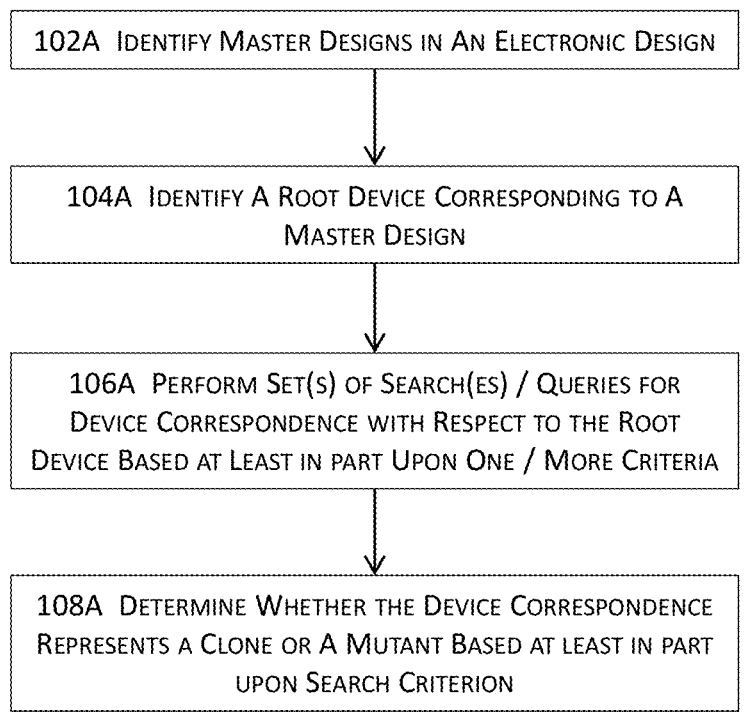
FIG. 1A illustrates a top level flow diagram for implementing electronic designs with cloning techniques in some embodiments.

FIG. 1A illustrates a top level flow diagram for implementing electronic designs with cloning techniques in some embodiments. In some embodiments illustrated in FIG. 1A, the method or system may identify multiple master designs of an electronic design at 102A. In some of these embodiments, an electronic design may include a schematic design, a layout, or a portion thereof. A master design may include a master cell or a master block of circuit components from which one or more instances may be instantiated in an electronic design.

At 104A, the method or system may identify a root device that corresponds to a master design. In some of these embodiments, the method or system may identify a plurality of master designs such as a plurality of master cells and then determine the respective numbers of occurrences of each of the plurality of master cells in an electronic design. The method or system may then identify one master design of the plurality of master designs and the corresponding devices of the identified master design. For example, the method or system may identify the master design that has fewer numbers of occurrences or the fewest number of occurrences in the electronic design and identify the corresponding devices of the identified master design.

From the identified corresponding devices of the identified master design, the method or system may identify a root device. For example, the method or system may identify the corresponding devices and store these corresponding devices in an ordered list. The corresponding devices may be stored in any order or priority and store these corresponding devices in such an order or priority. The method or system may then identify a device from the ordered list as the root device. For example, the method or system may identify the corresponding devices and arrange these corresponding devices in an ordered list from the device at the bottom left of corner to the device at the upper right corner of the electronic design. The method or system may then identify any device from the ordered list (e.g., the first device, the last device, or any device in between in the ordered list) as the root device.

At 106A, the method or system may perform one or more sets of searches or queries for identifying or determining device correspondence with respect to the root device identified at 104A. In some of the embodiments illustrated in FIG. 1A, the queries may include placement queries that evaluate one or more predicates with respect to one or more criteria to retrieve placement or device information from one or more databases including design data of a schematic or a layout an electronic design of interest. At 108A, the method or system may use the device correspondence from the one or more searches or queries to determine whether the device correspondence represents a clone, a mutant, or a user-specified clone. More details about various acts of 104A, 106A, and 108A will be described in subsequent paragraphs with reference to FIGS. 1B-E.

Figure 1B:
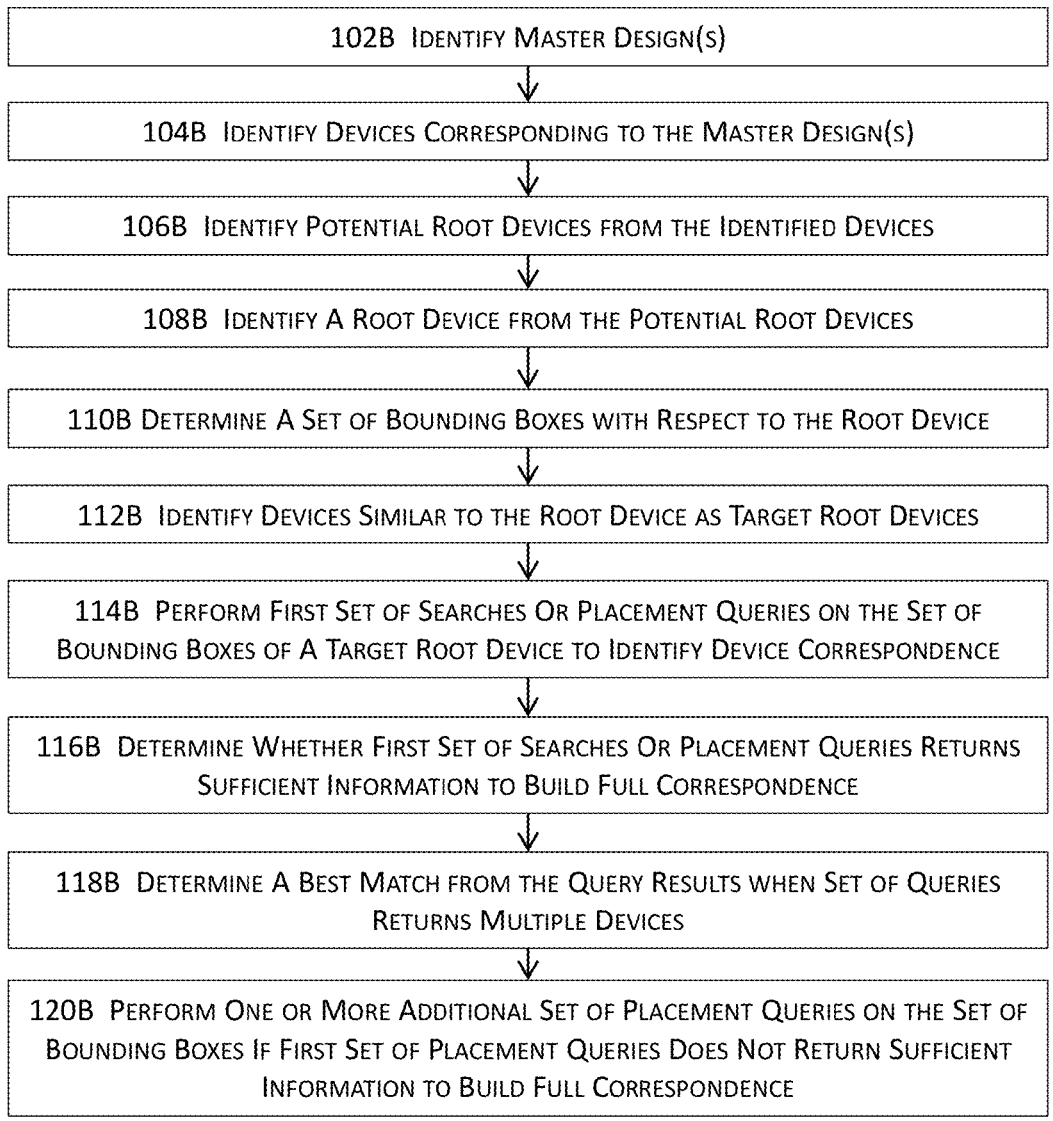
FIGS. 1B-C jointly illustrate a more detailed flow diagram for implementing electronic designs with cloning techniques in some embodiments.
Figure 1C:
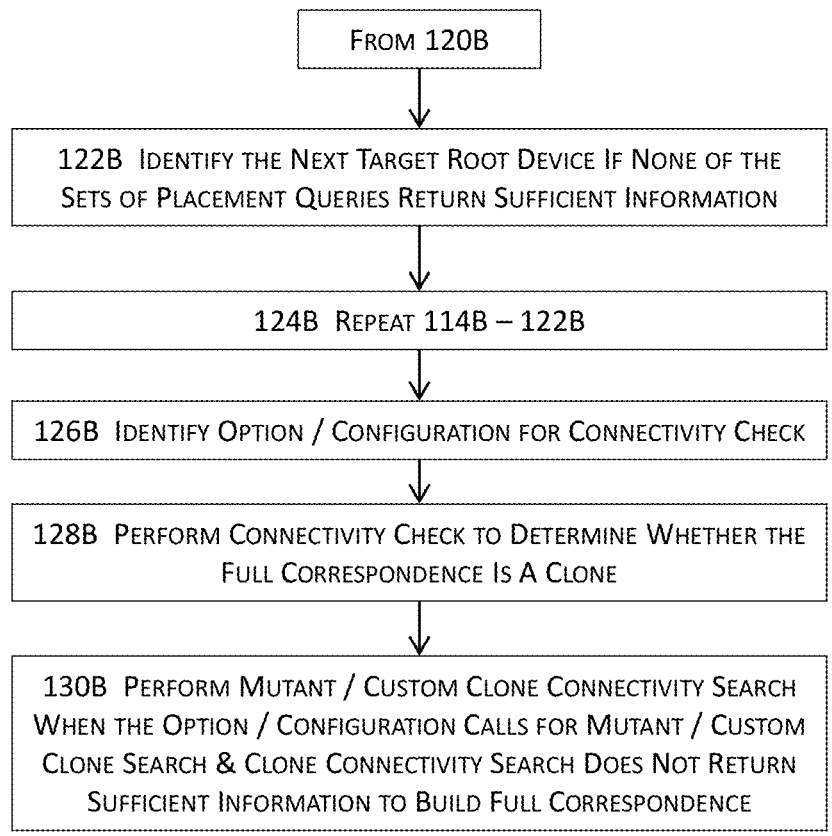

FIGS. 1B-C jointly illustrate a flow diagram of a method or system for implementing clone design components in an electronic design in some embodiments. In some of these embodiments illustrated in FIGS. 1B-C, the method or system may identify one or more master designs such as one or more master cells or blocks, each of which including one or more circuit components at 102B. In some embodiments, may identify the one or more master designs having the fewer number of occurrences with respect to a prescribed or user specified threshold number of occurrences or the fewest number of occurrences at 102B. The method or system may further identify one or more devices that correspond to the one or more master designs in the electronic design at 104B. These one or more devices may be instantiated in a schematic design or in a layout from the corresponding one or more master designs identified at 102B.

In some embodiments where the master design includes a parameterized cell or block, these one or more devices may be instantiated from the same master design with the same or different set of parameter values. At 106B, the method or system may identify the one or more devices as one or more potential root devices at 104B. In some embodiments, the method or system identifies the one or more devices having numbers of occurrences of instances that are equal to or less than a threshold number as the potential root devices at 106B. At 108B, the method or system may then identify a root device from the potential root devices identified at 106B.

In some of these illustrated embodiments, the method or system may identify the corresponding devices and store these corresponding devices in an ordered list. The method or system may then identify a device from the ordered list as the root device. For example, the method or system may identify the corresponding devices and arrange these corresponding devices in an ordered list from the device at the bottom left of corner to the device at the upper right corner of the electronic design. The method or system may then identify any device from the ordered list (e.g., the first device, the last device, or any device in between in the ordered list) as the root device.

In some embodiments, the method or system may identify the most significant potential root device as the root device, where the most significant device is the device with the fewest number of occurrences in the electronic design. In some embodiments, the method or system may identify the potential root devices in an ordered list at 106B. The ordered list may be arranged in any order. In some embodiments, the potential root devices may be arranged according to their locations in an area of an electronic design or according to their relative locations. For example, the potential root devices may be arranged where the potential root device in the lower left-hand side appears at the top of the ordered list, and the potential root device in the upper right-hand corner appears at the bottom of the ordered list. At 108B, the method or system may identify a root device from the potential root devices identified at 106B. The method or system may identify any potential root device as the root device at 108B. For example, the method or system may identify the first potential root device, the last potential root device, or any potential root device in between as the root device.

At 110B, the method or system may determine a set of bounding boxes with respect to the root device identified at 108B. The set of bounding boxes may be determined from the identified root device or from the bounding box or some reference geometry thereof of the identified root device. A bounding box may include the minimal area that encloses the identified root device and thus may be of a rectangular, rectilinear, or an arbitrary shape in some embodiments. The set of bounding boxes may be used to search for other devices in the region of interest in the electronic design. For example, the method or system may perform placement queries or searches on the set of bounding boxes to search for target devices that are similar to the identified root device.

At 112B, the method or system may identify one or more devices that are similar to the identified root device as the target root device. In some embodiments a device is similar to the identified root device if the device and the identified root device share the same master design. A first block of devices is substantially similar to the block including the root device if there exist no more than n-connectivity differences between the connectivity of the first block and the connectivity of the block including the root device, where "n" includes a number defined by a user. At 114B, the method or system may perform a first set of searches or queries (e.g., placement queries) on the corresponding set of bounding boxes for a target root device to identify device correspondence.

In some embodiments, the first set of searches may include a set of placement queries to be performed on a portion of an electronic design such as a set of bounding boxes of a target root device. The device correspondence includes the correspondence information between a clone source set including a clone source root device (e.g., the root device identified at 108B) and a corresponding set of target devices including the target root device (e.g., the target root device identified at 114B). This device correspondence includes information to show whether one portion (e.g., in one bounding box) of the clone source set matches or corresponds to another portion (e.g., a corresponding bounding box) of the corresponding set of target devices in some embodiments.

A bounding box relative to a target root device is determined to correspond to a root device when the content of the target root device bounding box is identical to that of the root device bounding box. A block of a circuit design is substantially similar to another block of circuit design there exist no more than n-connectivity differences between the block connectivity and the another block connectivity, where "n" includes a number defined by a user. The first set of placement queries may be selected from multiple sets of placement queries such as R0, R90, R180, R270, MY, MYR90, MX, MXR90, etc. where $R_N$ indicates rotation by N-degrees, and $M_{Axis}$ indicates mirroring against the Axis.

At 116B, the method or system may determine whether the first set of searches or placement queries returns sufficient information for full correspondence between the source device plus one or more other circuit components interconnected with the source device and the target root device plus the corresponding one or more circuit components interconnected with the target root device. In some embodiments where the a search or query (e.g., a single box query) in the first set of searches or placement queries returns multiple matches, the method or system may select the best match from the multiple matches at 118B. A best match may include a target device, the center of whose bounding box is situated closest to the corresponding center of a bounding box, and one or more other circuit components interconnected with the target device in some embodiments. In some of these embodiments, the method maintains only the best match, rather than the best match together with one or more matches from the multiple matches.

In some embodiments where the first set of searches or placement queries does not return sufficient information or any information at all for full correspondence between the target device plus one or more target circuit components interconnected with the target device and the source device plus one or more source circuit components interconnected with the source device, the method or system may return to 114B to perform one or more additional sets of searches or placement queries on the set of bounding boxes at 120B. For example, if the method or system performs the R0 set of placement queries at 114B that fails to return full device correspondence between the target root device plus one or more target circuit components interconnected with the target root device and the source root device plus one or more source circuit components interconnected with the source root device, the method or system may perform, for example, the R90 set of placement queries that rotate the bounding boxes with respect to the target root device by ninety (90) degrees in a particular direction.

In some embodiments where none of the first and additional sets of placement queries returns sufficient information or any information at all for full device correspondence between the target device plus one or more target circuit components interconnected with the target device and the source root device plus one or more source circuit components interconnected with the source root device, the method or system may identify the next target root device at 122B and repeat the processes from 114B through 122B at 124B in identical or substantially similar manners as those described above. In some other embodiments where at least one of the first and additional sets of placement queries returns sufficient information for full device correspondence, the method may proceed from 114B or 120B directly to 124B.

At 126B, the method or system may identify one or more options or configurations for connectivity check and/or connectivity search. The one or more options or configurations may include, for example, whether or not the search is for clones only, whether or not the search is for mutants only, whether or not the search is for user mutants only, whether or not the search is for clones and mutants only, or whether or not the search is for the clones, the mutants, and user clones, etc.

At 128B, the method or system may perform connectivity check to determine whether or not the full correspondence is a clone. If the one or more options or configurations identified at 126B allow, the method or system may perform mutant or custom clone connectivity search to search for mutants or custom clones at 130B when the clone connectivity search does not return sufficient information to build full correspondence. A mutant is a set of devices or circuit components that is different from the corresponding clone source set of devices that includes the clone source device and one or more other circuit components or devices interconnected with the clone source device, but the differences between the mutant and the corresponding clone source set are determined to be acceptable. For example, a mutant may include a set of circuit components whose interconnections are different from the interconnections of the clone source set, but the differences in the interconnections are determined to be within an acceptable limit or threshold. A user clone includes a device that may be defined by a user in some embodiments. In addition or in the alternative, a user clone may include one or more unconnected devices or circuit components that are not connected to each other or to one or more other devices or circuit components in the user clone. In some embodiments, a user clone may include a plurality of devices or circuit components that are completely unconnected to each other. In contrast, all devices and circuit components in a mutant are interconnected.

Figure 1D:
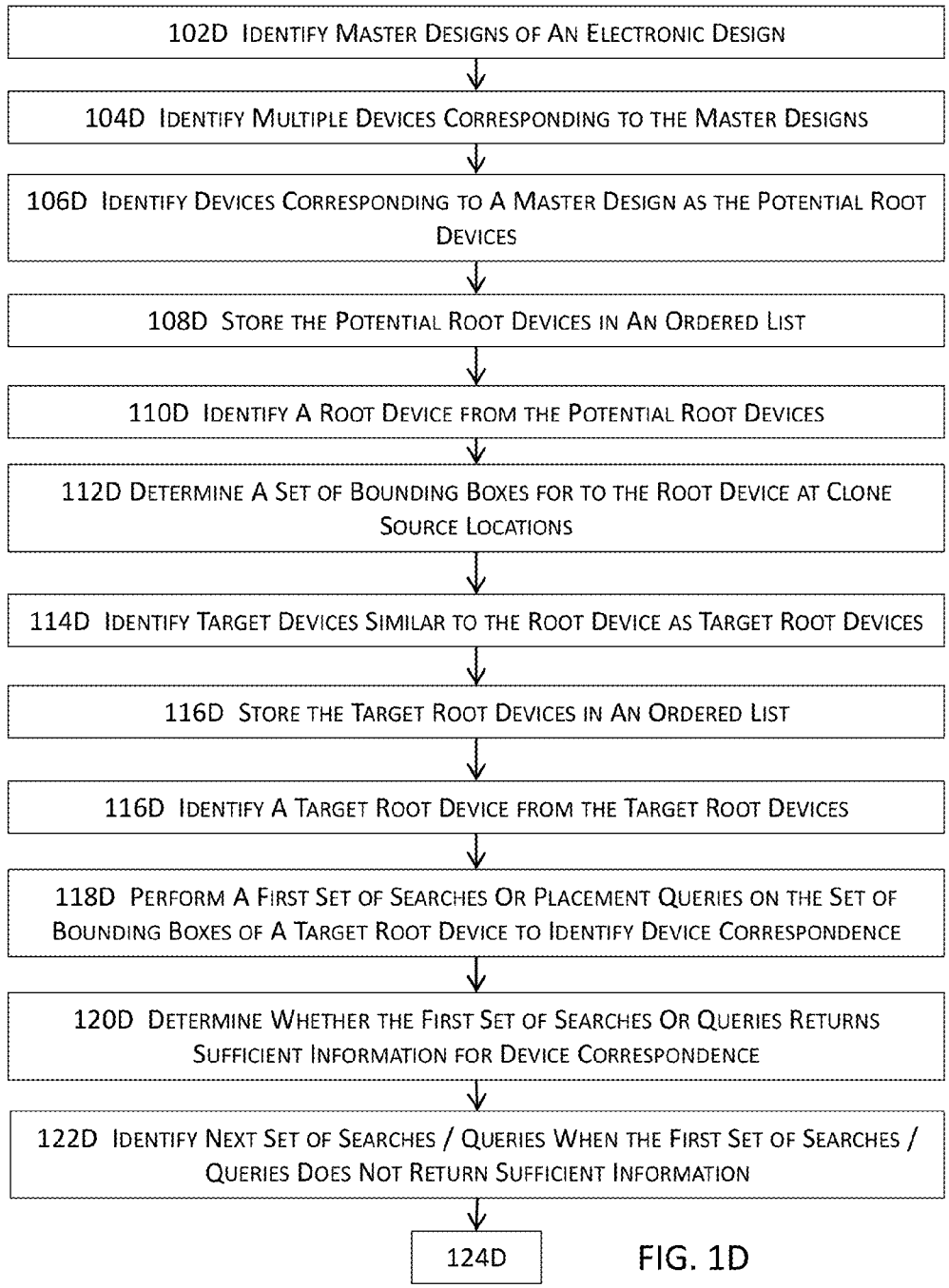
FIGS. 1D-E jointly illustrate a more detailed flow diagram for implementing electronic designs with cloning techniques in some embodiments.
Figure 1E:
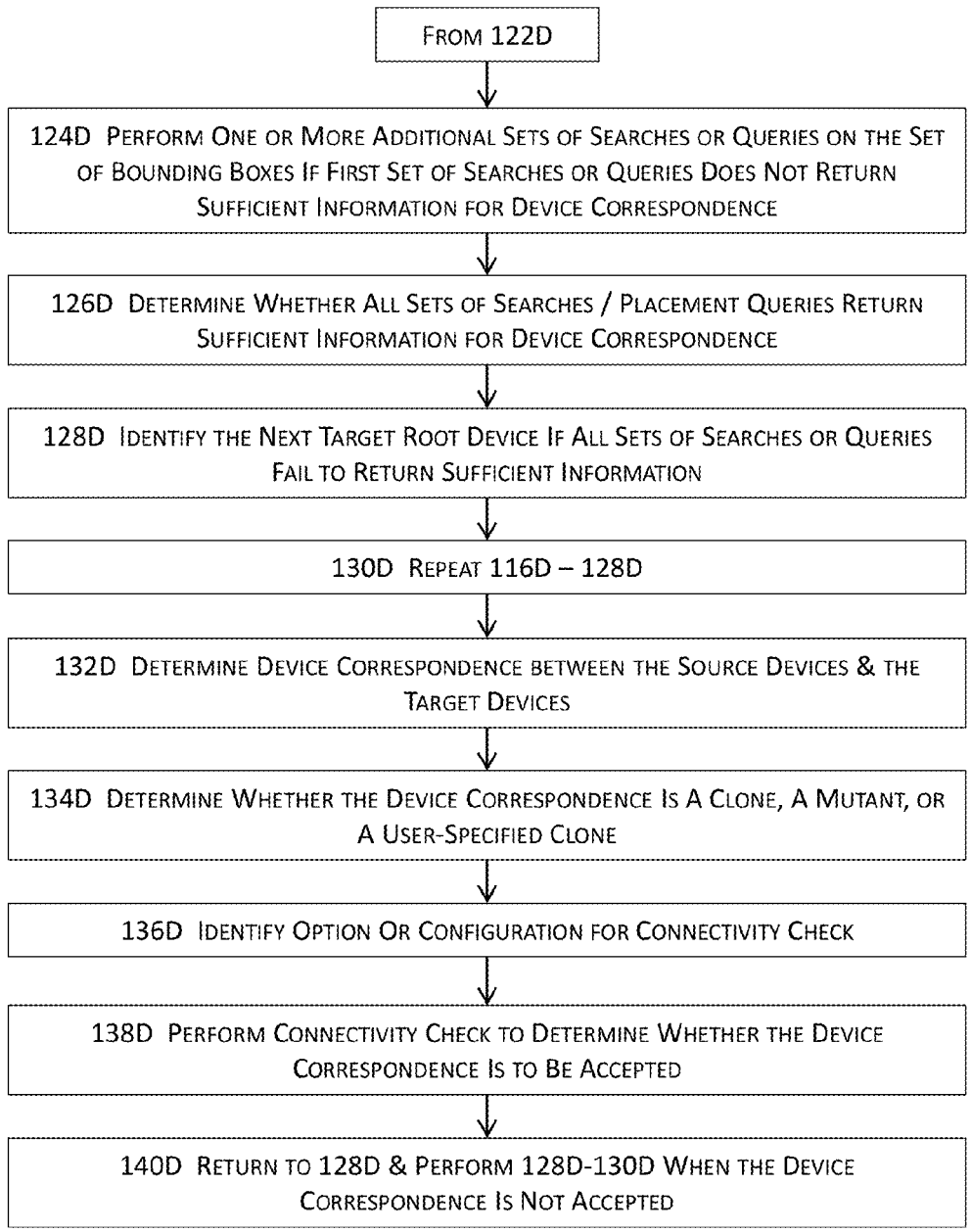

FIGS. 1D-E jointly illustrate a more detailed flow diagram for implementing electronic designs with cloning techniques in some embodiments. In these embodiments illustrated in FIGS. 1D-E, the method or system may identify one or more master designs of an electronic design at 102D in substantially similar manners as those described for 102B of FIG. 1B. The method or system may identify one or more devices corresponding to each of the one or more master designs at 104D. The one or more devices corresponding to a master design may include the schematic or layout designs of devices that are instantiated from the master design in some embodiments.

At 106D, the method or system may identify a master design from the one or more master designs and identify one or more devices corresponding to the master design. The method or system may identify any one master design from the one or more identified master design. For example, the method or system may identify the master design with the fewest number of occurrences in an electronic design or a portion thereof and then identify devices that are instantiated from the master design in a schematic or layout of the electronic design as the potential root devices at 106D. At 108D, the method or system may store the potential root device in an ordered list. The potential root device may be stored in any order in the ordered list.

At 110D, the method or system may identify a root device from the potential root devices. Any potential root device may be identified as the root device. In some embodiments, the method or system iterates through all of the identified potential root devices, and thus the order in which a root device is identified may be of some design choice. At 112D, the method or system may determine a set of bounding boxes for the root device at the corresponding clone source locations. In some embodiments, the method or system may identify various components of interest in a clone source and determine the respective bounding boxes to enclose these components of interest with respect to the identified root device.

For example, the method or system may identify the relative locations of the components of interests to the root device or a reference point or geometry, determine the respective sizes or a uniform size for the bounding boxes, and record the relative positioning of the bounding boxes with respect to the root device or reference geometry. The size of a bounding box may be determined in any manner as long as the bounding box encloses at least a substantial portion of the corresponding component of interest. At 114D, the method or system may identify one or more devices that are similar to the identified root device as the one or more target root devices. In some embodiments a device is similar to the identified root device if the device and the identified root device share the same master design.

A set of devices or circuit components is substantially similar to the clone source set including the clone source device if there exist no more than n-connectivity differences between the connectivity of the device plus one or more circuit components interconnected with the device and the connectivity of the source root device plus one or more source circuit components interconnected with the source root device, where "n" includes a number defined by a user. The method or system may use a target root device as a reference point of a clone target, project the set of bounding boxes determined for the root device to the corresponding set of bounding boxes for the target root device, and perform one or more sets or groups of searches or queries in the area defined by this corresponding set of bounding boxes to determine whether a full set of device correspondence may be obtained (e.g., the content of each bounding box of the root device matches or corresponds to the content of the corresponding bounding box of the target root device.)

At 116D, the method or system may store the identified target root devices in an ordered list. The method or system may store the identified target root devices in any order. At 118D, the method or system may perform a first set of searches or queries (e.g., placement queries) on the set of bounding boxes with respect to target root device to identify device correspondence between the set of bounding boxes of the root device and the corresponding set of bounding boxes of the target root device. At 120D, the method or system may determine whether the first set of searches or queries returns sufficient information for the device correspondence. Sufficient information may include information between each bounding box of the root device and the corresponding bounding box of the target root device to determine whether the content of the bounding box matches or is substantially similar to that of the corresponding bounding box.

In some embodiments, the content of a bounding box of the root device may or may not exactly match that of the corresponding bounding box. More specifically, the method or system may ignore slight differences therebetween because the bounding boxes may encompass more area than what the circuit components actually occupy. In addition or in the alternative, the method or system may ignore the differences in connectivity if the differences are within n-connectivity difference as described above. At 122D, the method or system may identify the next set of searches or queries when the first set of searches or queries does not return sufficient information.

The method or system may determine that the returned information is insufficient when the first set of searches or queries returns some results that do not match or are not substantially similar to that of the master design in some embodiments. The method or system may determine that the returned information is insufficient when the first set of searches or queries does not return any devices at all that satisfy the search or query criteria. For example, the method or system may not establish any correspondence between one or more bounding boxes with respect to the root device and one or more corresponding bounding boxes with respect to the target root device.

At 124D, the method or system may perform one or more additional sets of searches or queries on the corresponding set of bounding boxes when the first set of searches or queries fails to return sufficient information for device correspondence. For example, the method or system may perform one or more sets of the R90, R180, R270, MY, MYR90, MX, MXR90 searches or queries if the set of R0 searches or queries fails to return sufficient information for device correspondence. In some embodiments, the method or system may nevertheless perform the one or more additional sets of searches or queries even though the first set of searches or queries returns sufficient information for device correspondence such that the method or system may determine whether the device correspondence is a clone, a mutant, or a user clone.

In these embodiments, the method or system may perform one or more addition sets of searches or queries to further identify additional device correspondence which may lead to identification of additional clones, mutants, or user clones. At 126D, the method or system may further optionally determine whether all sets of searches or queries return sufficient information for device correspondence. The method or system may then identify the next target root device at 128D when all sets of the searches or queries fail to return sufficient information for device correspondence. The method or system may proceed to 130D to repeat the acts of 116D through 128D as described above.

At 132D, the method or system may determine the device correspondence between the source root device plus one or more source circuit components interconnected with the source root device and the target device plus one or more target circuit components interconnected with the target device and further determine whether the correspondence includes a clone, a mutant, or a user clone at 134D. At 136D, the method or system may further optionally identify one or more options or configurations for connectivity check. For example, the method or system may identify an option or configuration specifying whether the targets of the connectivity check include one or more clones, one or more mutants, one or more user clones, or any combination thereof.

At 138D, the method or system may perform the connectivity check to determine whether the device correspondence is to be accepted. For example, if the option specifies that the method or system is to identify only clones, yet the search or query results include mutants, the method or system may determine that the device correspondence is to be rejected. At 140D, the method or system may return to 128D and repeat the acts of 128D through 130D for the next target root device when the device correspondence is not to be accepted.

With the device correspondence and optionally with the connectivity check, the method or system may thus identify the clones, mutants, or user clones in an electronic design such that the clone source may be replicated in the electronic design or at least a portion thereof. For example, the method or system may identify that a first block of schematic design corresponds to various clones, mutants, and user clones. The method or system may thus identify or generate the physical design of the first block in the layout and replicate the physical design of the first block in the layout without proceeding through the same design cycle for the clones of the first block.

In addition, the method or system may replicate at least a substantial portion of the physical design of the first block in the layout for the mutants (or user clones) and complete the physical designs for these mutants by incorporating the stored differences between the clone source and the mutants (or user clones). In some embodiments, the method or system may perform various acts described herein without performing or requiring to perform connectivity search as conventional approaches do. In addition or in the alternative, by using multiple sets of searches or queries with different rotations and/or mirroring with respect to one or more axes, the method or system may identify the clones, mutants, and/or user clones that may be difficult to identify due to their different orientations or arrangements in an electronic design or may not even be expected by designers or conventional approaches with the same efficiency in and ease of identification.

Figure 5:
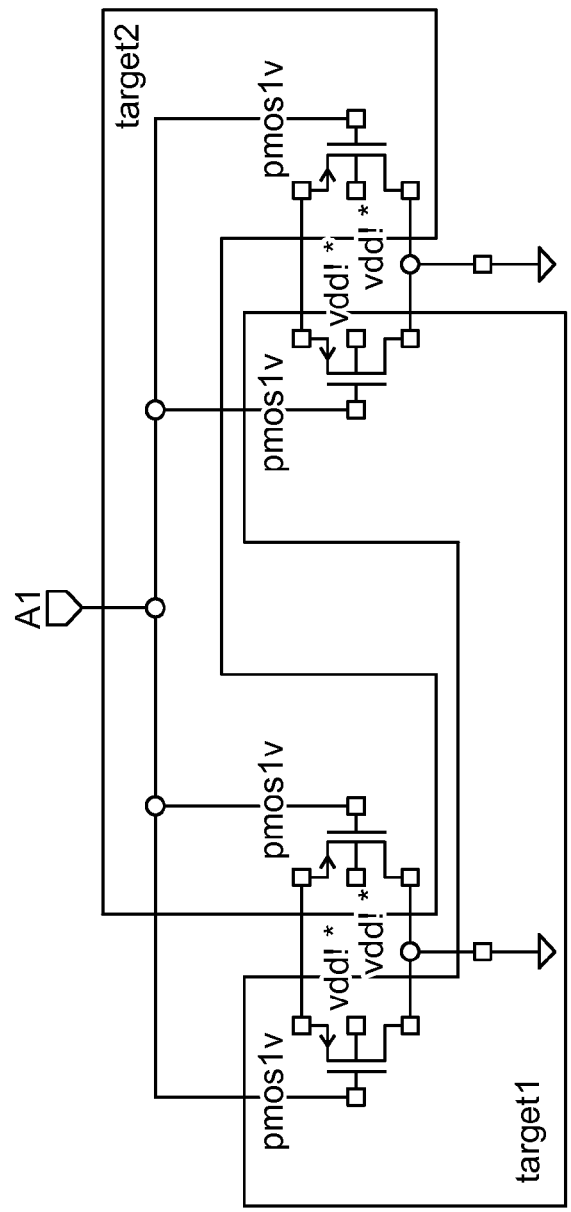
FIG. 5 illustrates two possible target root devices that may be identified with connectivity search processes.
Figure 5:
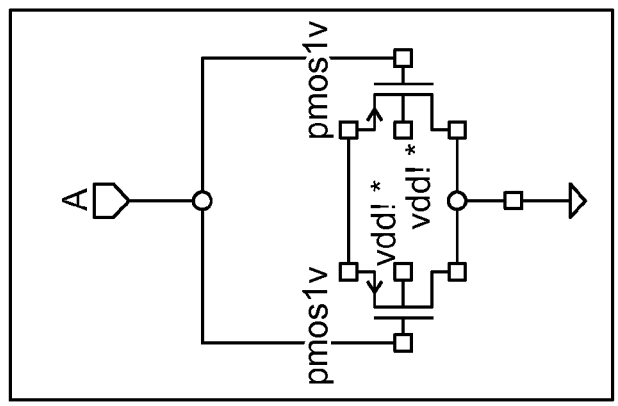

Considering the schematic illustrated in FIG. 5 which illustrates two possible target root devices (target 1 and target 2) that may be identified with some techniques described herein in some embodiments. Because target pmos (p-channel metal-oxide semiconductor field-effect transistor) are all exactly equivalent from a connectivity point of view, the connectivity search process may find the target devices as shown in FIG. 5. Conventional cloning approaches often treat the "equivalent" devices (e.g., clones) in some forms of an alphabetical order of, for example, the names or identifiers of the devices during the search. As a result, the results generated by conventional approaches depend highly on the identifiers or names of the devices being searched and thus exhibit low quality of results or the results illustrated in FIG. 5 that deviate from what the designers may have expected.

Figure 6:
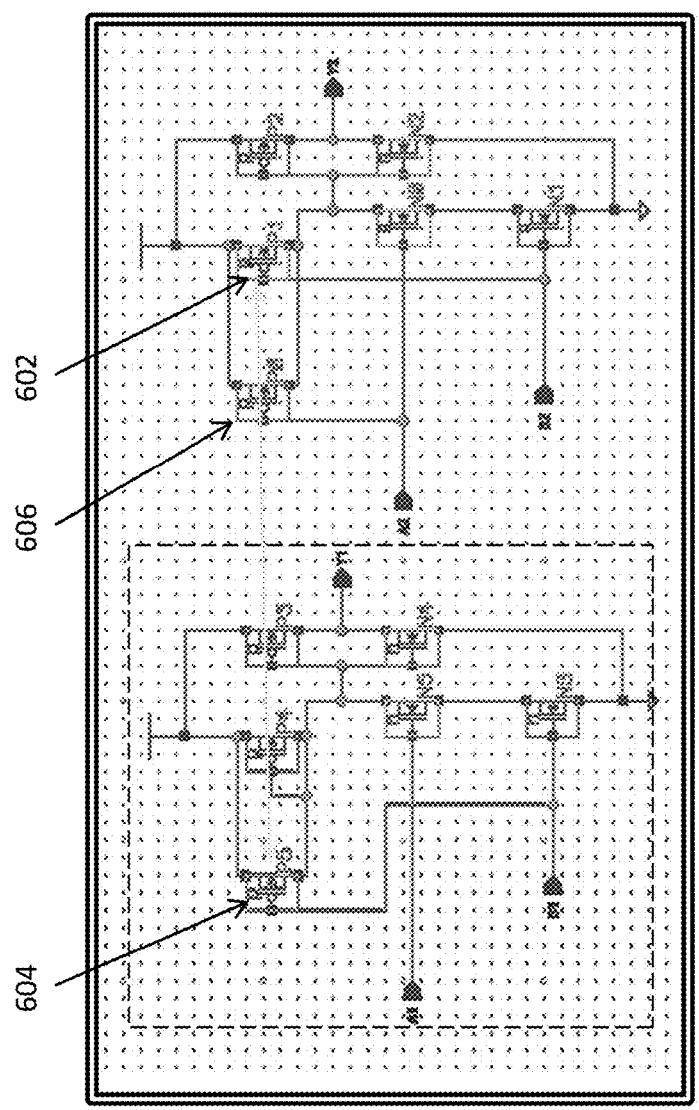
FIG. 6 illustrates a working example including a portion of a schematic design in some embodiments.

On the other hand, various techniques described herein use placement queries and do not depend on how the devices in an electronic design are named. Therefore, the described techniques always correctly identify the target devices, which may not even be detectable with conventional approaches, to ensure high quality of the results and to identify the target devices that exactly or closely match what designers may have expected. As illustrated in FIG. 6 which illustrates a working example including a portion of a schematic design in some embodiments, connections between the two sets of devices are slightly different, thus the clone connectivity search process may not identify a clone target. The method or system described herein may invoke the mutant connectivity search process to successfully identify a mutant, even though the identified mutants it may not be the one expected by users. The method or system may also identify and highlight correspondences with some graphical emphasis (e.g., by using the same color).

In this example illustrated in FIG. 6, connections between the two sets of devices are slightly different, and the clone connectivity search process thus does not identify a clone target. The mutant connectivity search process, on the other hand, identifies device P1 (602) as a match for device P5 (604), whereas device P0 (606) would certainly be the match expected by user. The built-in fuzziness provided by the mutant search process (as well as the clone search process) with multiple groups or sets of placement queries using bounding boxes and the adjustable, configurable threshold tolerances in determining what degree of differences between the source and target provide great improvement in the search results over conventional approaches.

Figure 7:
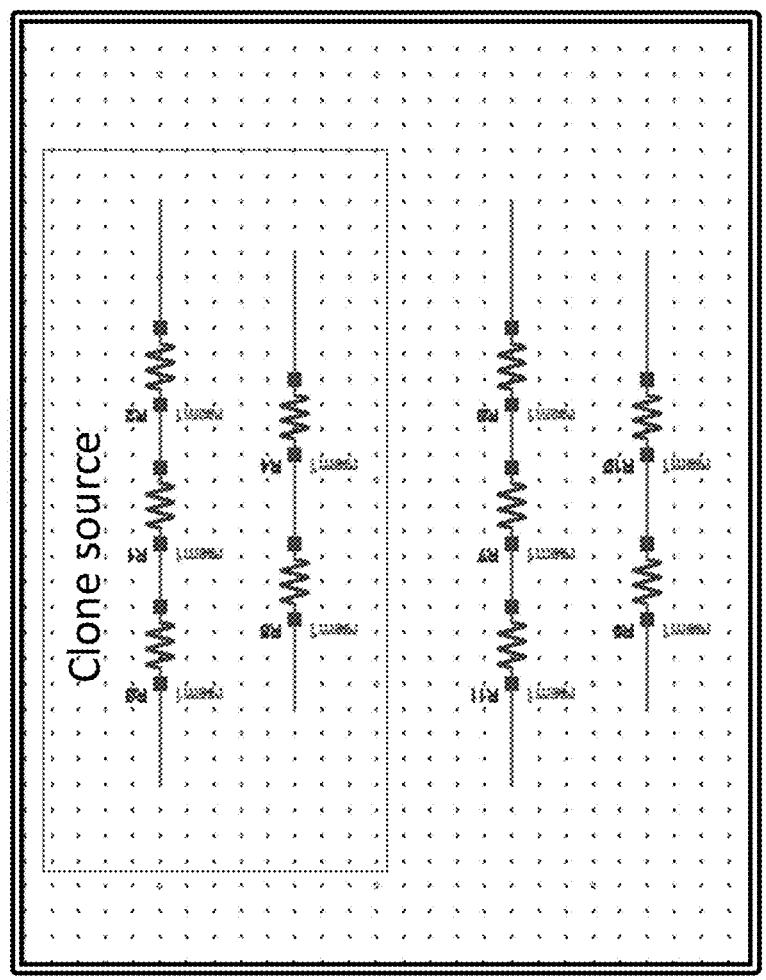
FIG. 7 illustrates an example including a clone source and an unconnected set of devices of a schematic design in some embodiments.

Another advantage of the techniques described herein is that the devices need not be connected in the electronic design in order for various techniques to apply. In other words, the clone source structure needs to be a sub graph. This means that each device needs to be connected to at least one other device from the structure in order for the conventional approaches to function. Various search processes and techniques described herein may perform their intended functions to identify the targets even when some devices are not connected to any other devices at all. Further, conventional connectivity search processes cannot run on the clone source illustrated in FIG. 7 because the two rows of resistor are not connected together. The clone connectivity search process and the mutant connectivity search process described in various embodiments may nevertheless successfully identify the clones and mutants for the source respectively even though the source includes disconnected devices (e.g., the two disconnected rows of resistors in FIG. 7).

In addition or in the alternative, the schematic placement of the devices may be used to identify a set of correspondence between the source and potential target devices, then the connectivity is checked to verify that the target set is a clone or a mutant (i.e. check that the target devices and source devices are inter-connected in a similar way, or check that the connectivity difference are less than 'n' differences specified by user). In some embodiments where the new "placement search" algorithm fails to find clones or mutants the existing "connectivity search" algorithms may be used.

Figure 8:
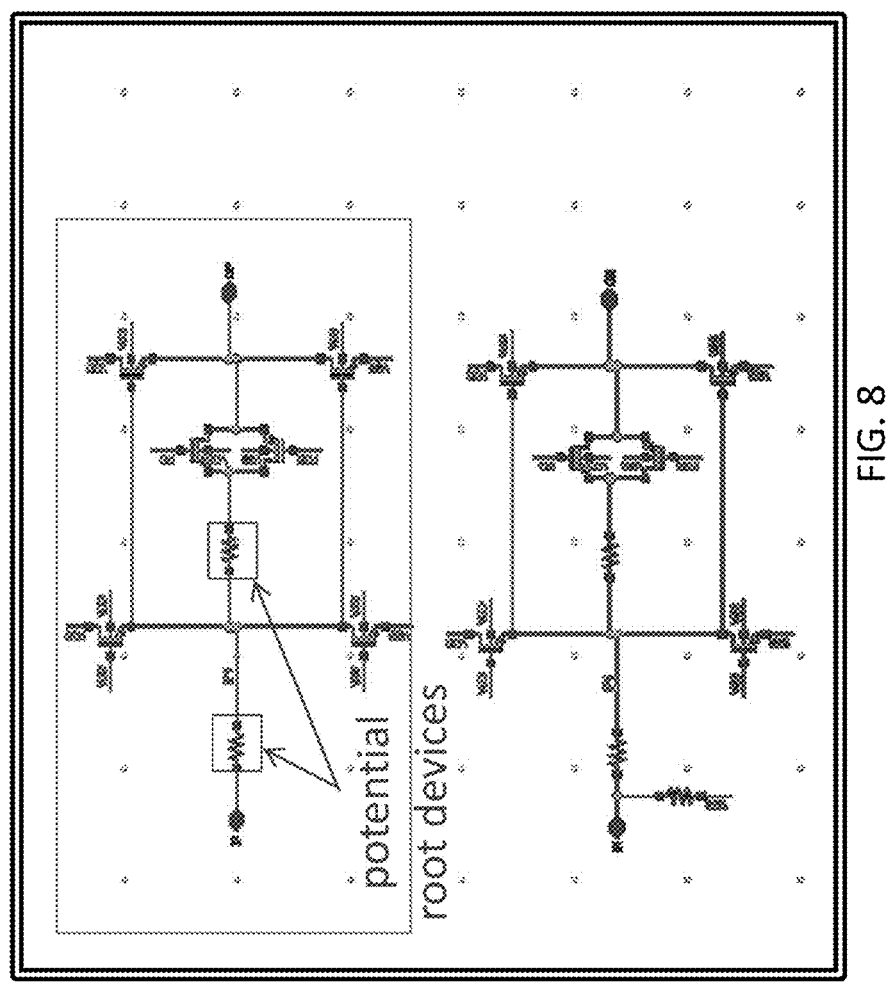
FIG. 8 illustrates a working example including a portion of a schematic design in some embodiments.
Figure 9:
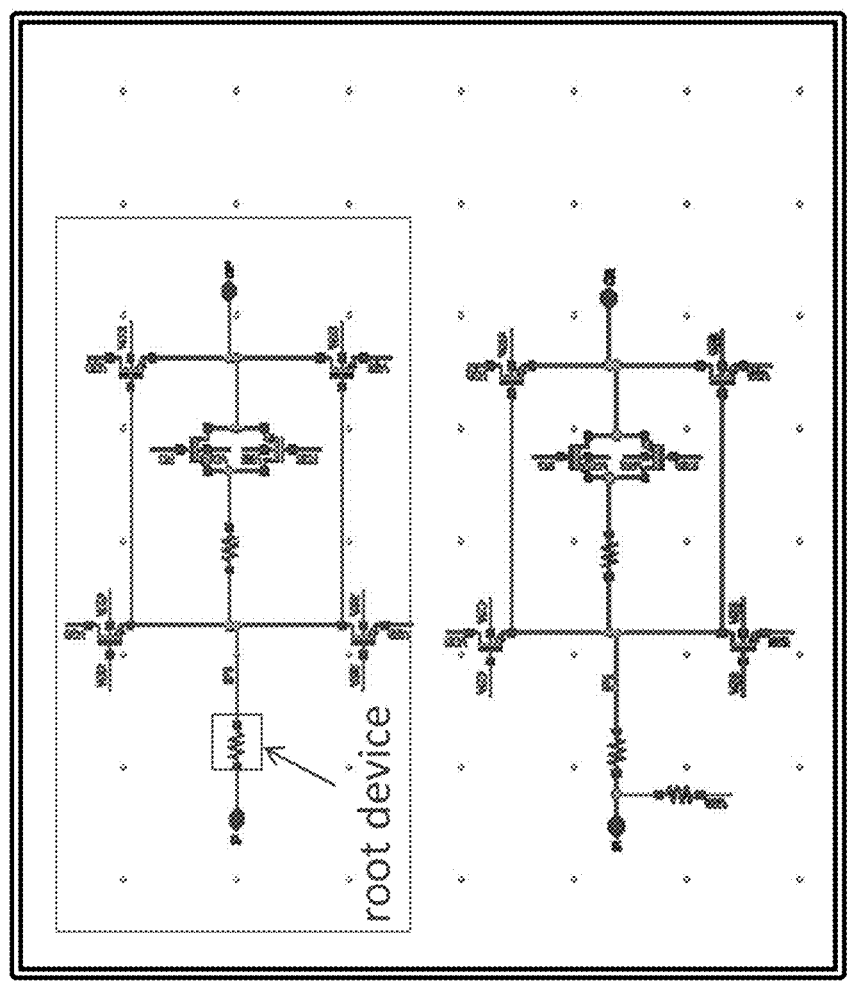
FIG. 9 illustrates a working example including two candidate root devices in some embodiments.

In some embodiments the placement search process identifies a root device among the clone source devices. In some of these embodiments, the most significant device may be identified as the root device. In some of these embodiments, the devices which instantiated from the master with a fewer number of occurrences in the source is collected. These devices may constitute potential root devices. In the example illustrated in FIG. 8, there are only two (2) resistors and six (6) nmos, in the clone source. The method or system may identify the two resistors as the candidates root devices in some of the embodiments illustrated in FIG. 8. The method or system may identify a root device from the candidate root devices. In the above example illustrated in FIG. 8, the method may identify the lower left or the leftmost device between the two candidate root devices as a root device as illustrated in FIG. 9.

Figure 10:
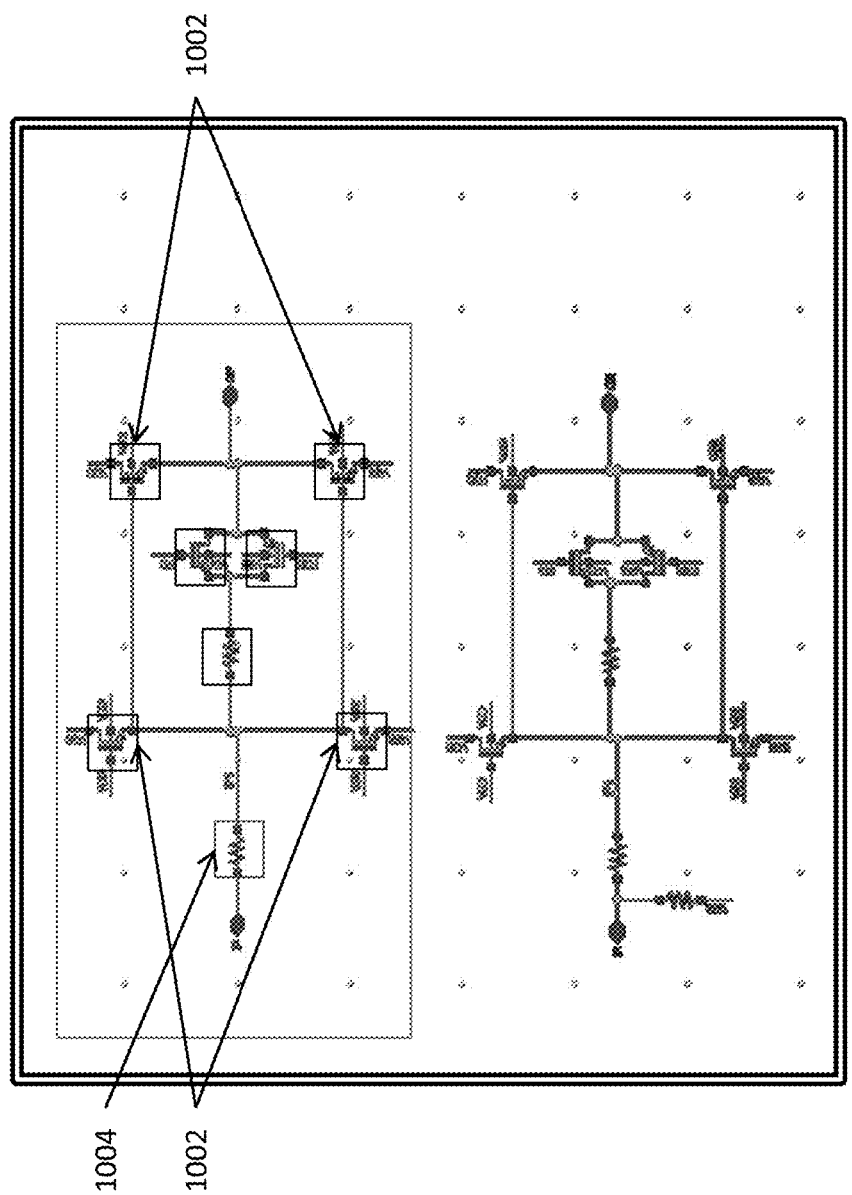
FIG. 10 illustrates an example showing the determination or identification of bounding boxes for a root device in some embodiments.
Figure 11:
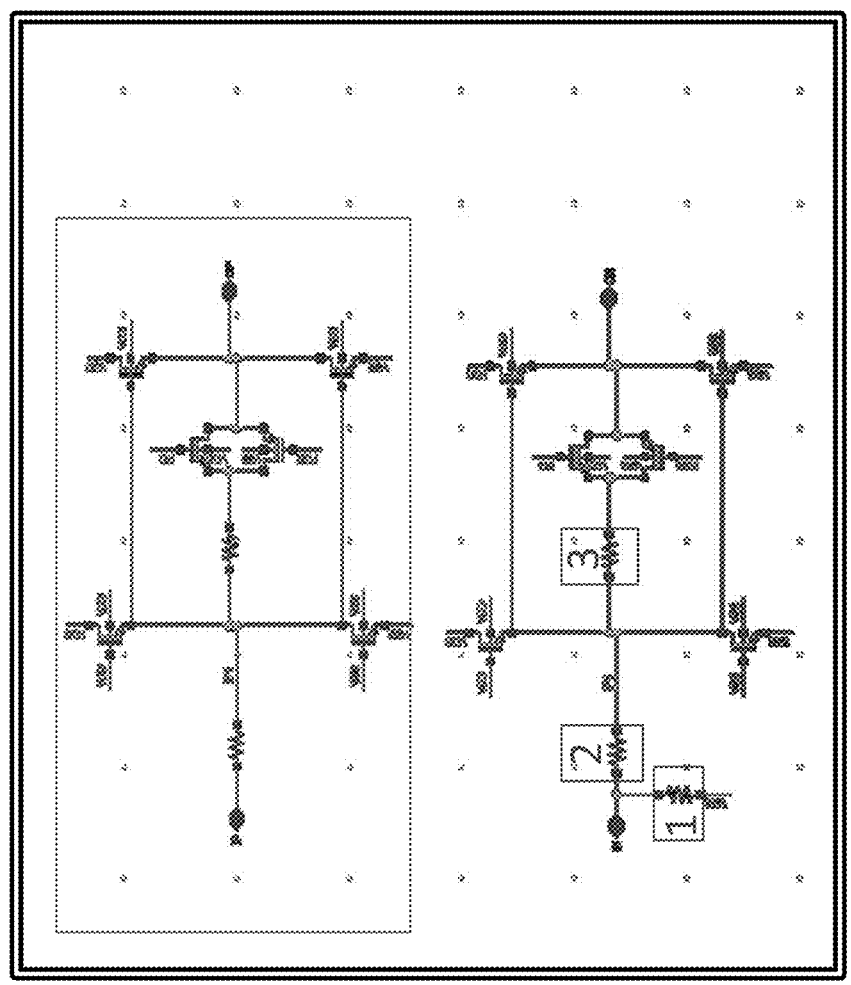
FIG. 11 illustrates an example showing identification of multiple target root devices in an ordered list in some embodiments.

For the placement search process, the method or system may further determine and collect a set of devices bounding box (bBox) 1002 relative to the root device origin where 1004 represents the clone source in FIG. 10. The method or system may identify similar or identical devices in the design as target root devices. A target root device includes a device with the same master as the root device and may be instantiated with the same or different set of parameters. In some embodiments, the method or system may identify the target root devices in an ordered list. For example, the method or system identifies the target root devices in an ordered list (1, 2, 3) from the lower let to the upper right in the example illustrated in FIG. 11.

Figure 12:
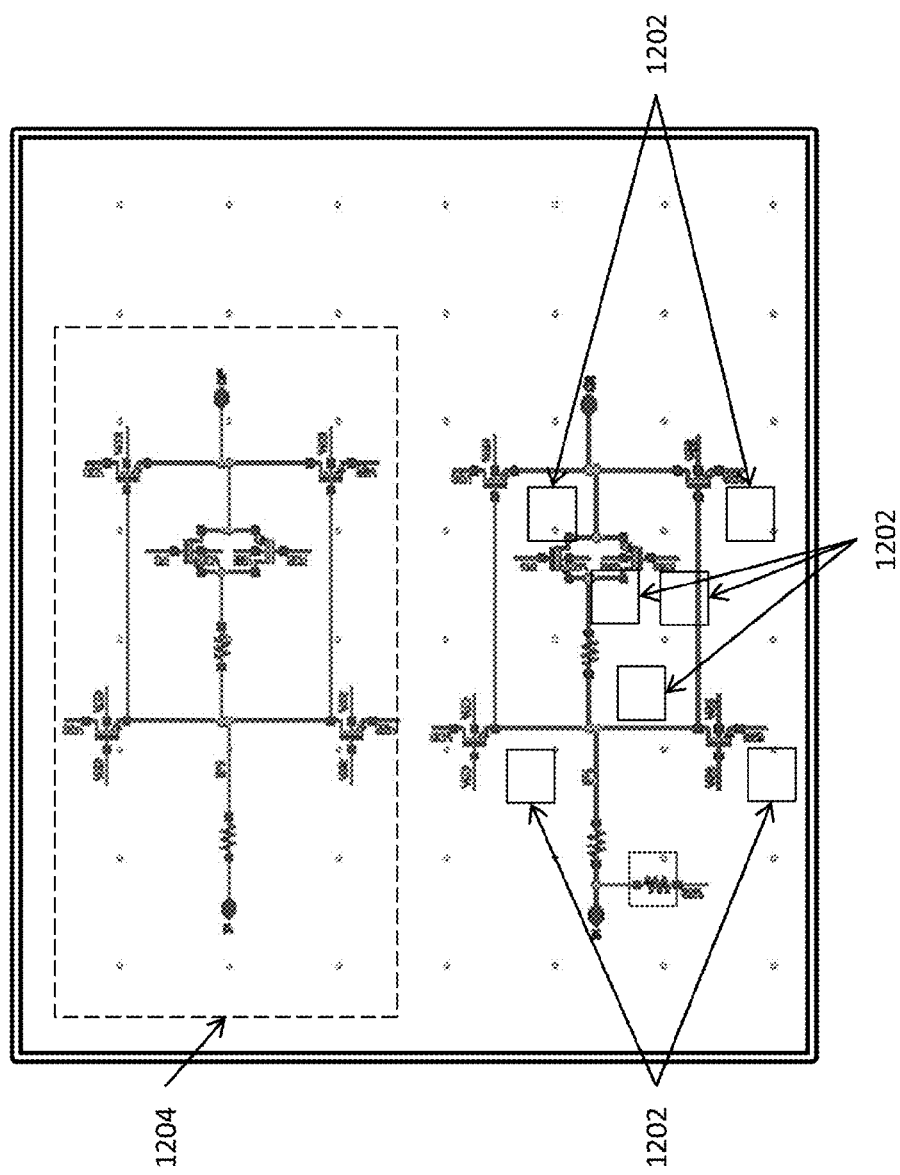
FIG. 12 illustrates an example showing the performance of a first set of searches in the relative bounding boxes for a target root device in some embodiments.

To continue with the placement search, the method or system may identify a target root device, start from the identified target root device, and perform one or more placement queries on the relative bounding boxes to identify device correspondences. To illustrate, FIG. 12 shows that one of eight (8) possible sets—R0, R90, R180, R270, MY, MYR90, MX, and MXR90—of placement queries are performed to identify the possible orientation where $R_N$ indicates rotation by N-degrees, and $M_{Axis}$ indicates mirroring against the Axis. More specifically, FIG. 12 illustrates the R0 set of queries, and the remaining seven (7) sets of queries are omitted for clarity and ease of illustration purposes. These queried regions are illustrated as boxes 1202 of FIG. 12 where 1204 indicates the clone source. In FIG. 12, some of the query boxes are empty, and thus the R0 set of queries does not return full device correspondence.

Figure 13:
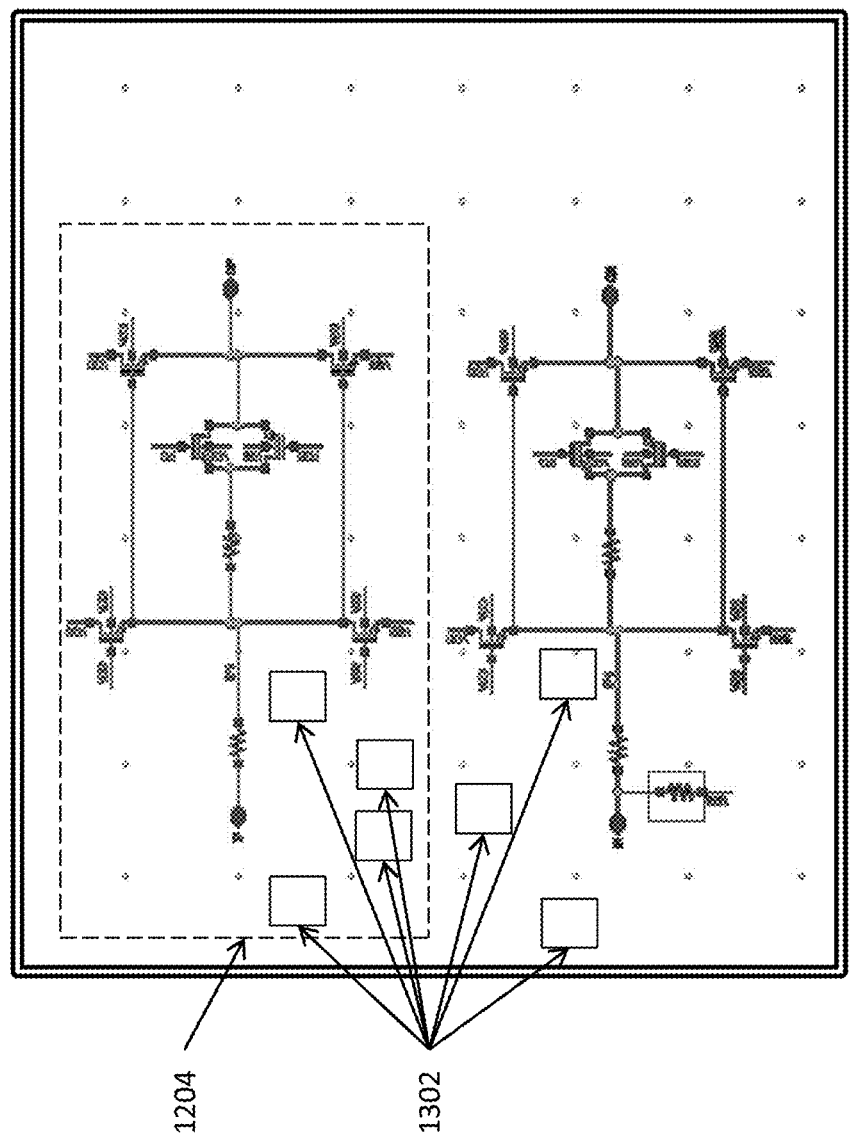
FIG. 13 illustrates an example showing the performance of a second set of searches in the relative bounding boxes for a target root device in some embodiments.

The method or system may continue the placement search by continuing to perform the placement queries in the next orientation or mirroring when one placement query does not return any device or does not return device with the appropriate master. FIG. 13 illustrates that the R90 set of placement queries in comparison with the R0 set of queries illustrated in FIG. 12. In FIG. 12, the R0 set of queries does not return sufficient information to build a full correspondence between the source devices and the target devices. In this situation, the method or system may continue with the R90 set of placement queries (or another set of queries) as shown in FIG. 13. The queried regions in FIG. 13 are illustrated in solid, rectangular boxes 1302. Similar to the query results illustrated in FIG. 12, all of the query boxes in the R90 set of queries are empty, and thus the R90 set of queries also does not return full device correspondence.

Figure 14:
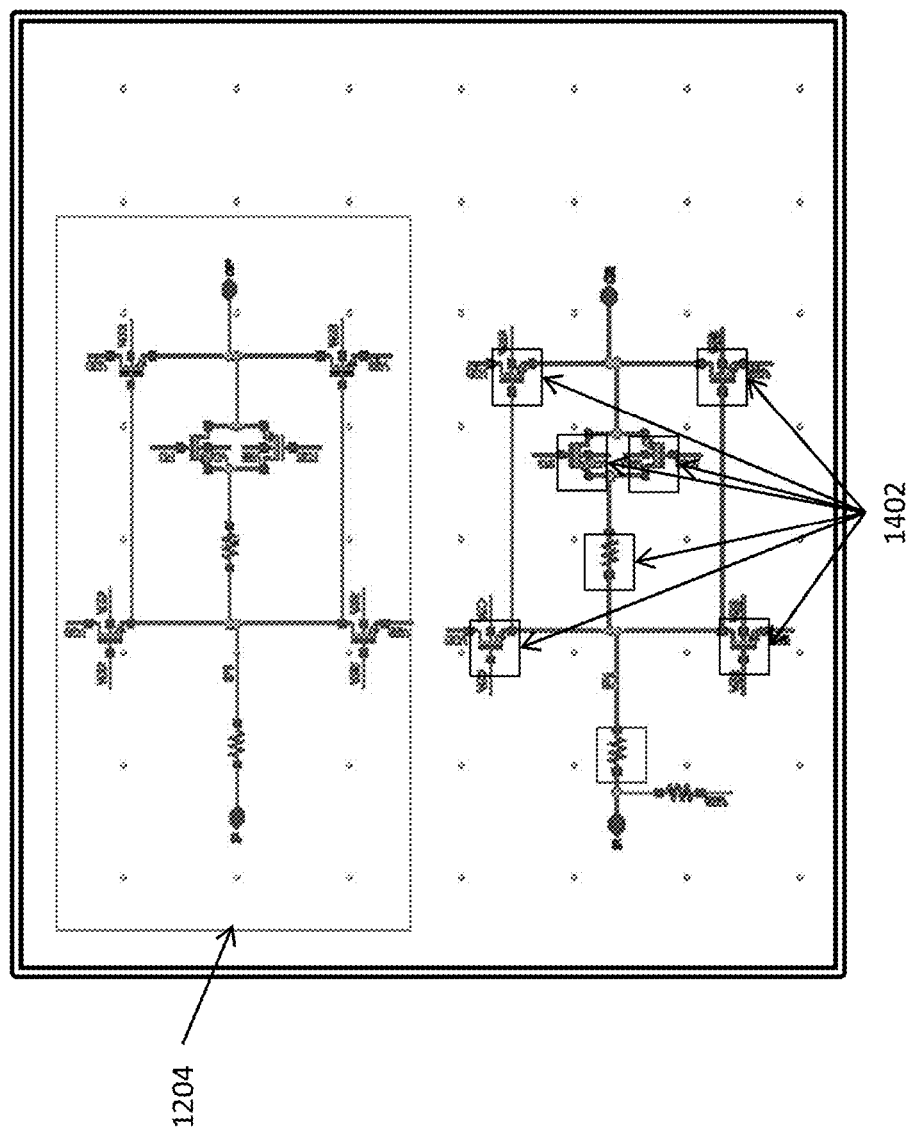
FIG. 14 illustrates an example showing the performance of a third set of searches in the relative bounding boxes for a target root device in some embodiments.

In some embodiments where none of the eight groups of placement queries return sufficient information to build full correspondence, the method or system may identify the next target root device and repeat substantially the same processes as described above for the next target root device. For example, FIG. 14 illustrates that the method or system performs the R0 group of placement queries for the next target root device, and the R0 group of placement queries return sufficient information for the method or system to build the full correspondence. The queried regions are illustrated as rectangular boxes 1402 in FIGS. 14, and 1204 represents the clone source.

In some embodiments described herein, the method or system may ignore slight differences between device placements because the placement queries are performed on the device bounding boxes. In some embodiments, the method or system may accept differences between device placements if the differences are determined to fall within a predetermined threshold. In some embodiments where one placement query returns several devices, the method or system may identify the device exhibit the best matching characteristics. For example, the method or system may identify the device whose center of the bounding box is the closest to the center of the bounding box of the placement query in some embodiments. As another example, the method or system may identify the device exhibiting the least amount of differences in some other embodiments.

When the method or system identifies sufficient information for the full correspondence, the method or system may perform a connectivity check process to determine whether the set of correspondence includes a clone, a mutant, or a "user clone" in some embodiments. A user clone includes a set of unconnected devices or a mutant with more than a predetermined threshold of connectivity differences. Depending upon the options or configurations, the method or system may perform the connectivity check process to search only for clones, only for mutants, or for both clones and mutants.

In some embodiments where the connectivity checker process rejects the correspondence set, the method or system may perform identical or substantially similar processes for the next orientation or the next target root device as described above. For example, the connectivity check process may reject the correspondence set because the option or configuration calls for clones, yet the correspondence set includes a mutant including a plurality of devices or circuit components, and the method or system may perform identical or substantially similar processes for the next orientation or the next target root device as described above.

Figure 2:
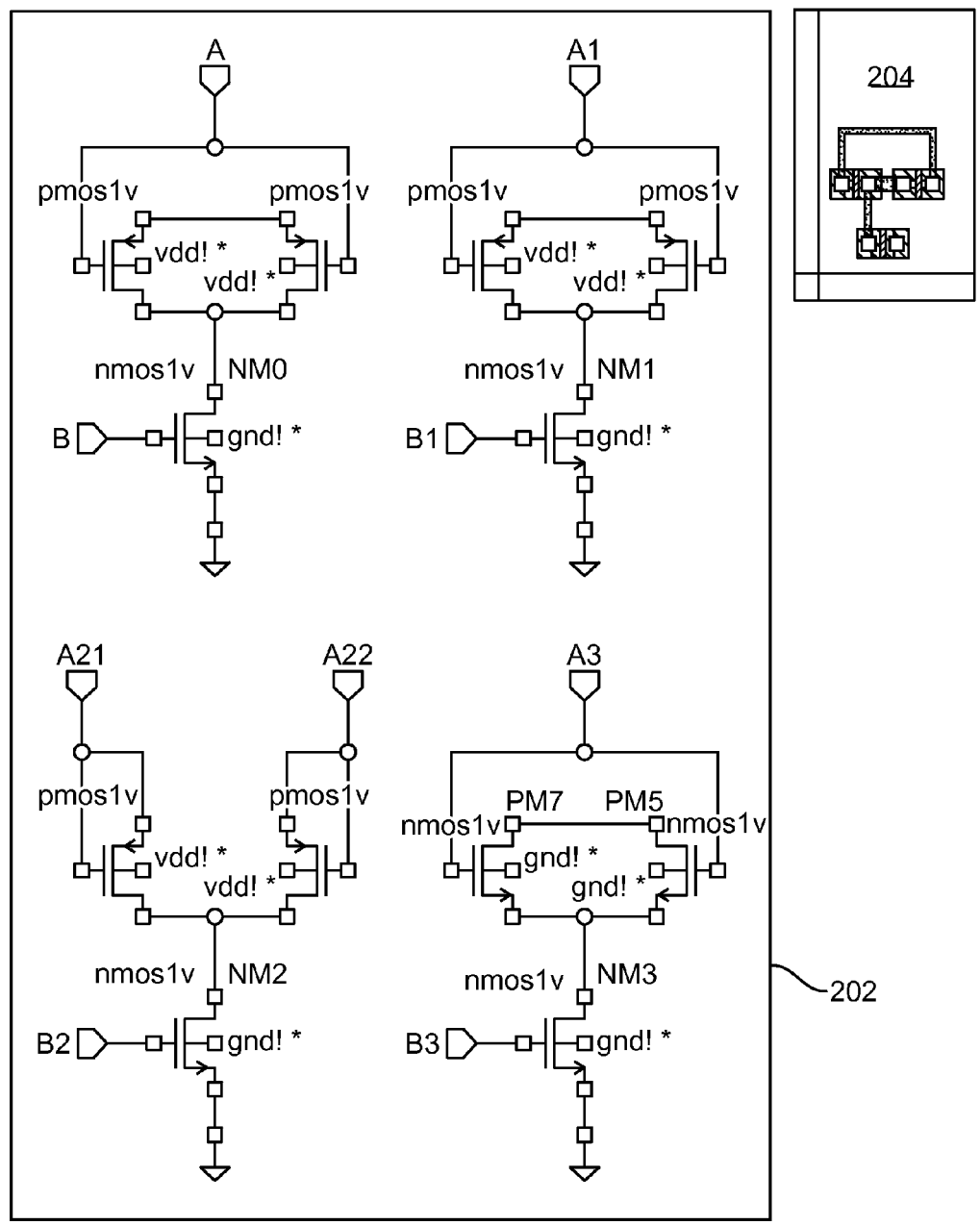
FIG. 2 illustrates a schematic that may be implemented with various techniques described herein in some embodiments.

FIG. 2 illustrates a schematic 202 that may be implemented with various techniques described herein in some embodiments. In FIG. 2, a set of clone source instances 202 may be implemented in the layout and partially routed as shown in the right-hand portion 204 of FIG. 2. During the electronic design process flow, users may wish to create one or more clones from this set of clone source instances.

Figure 3:
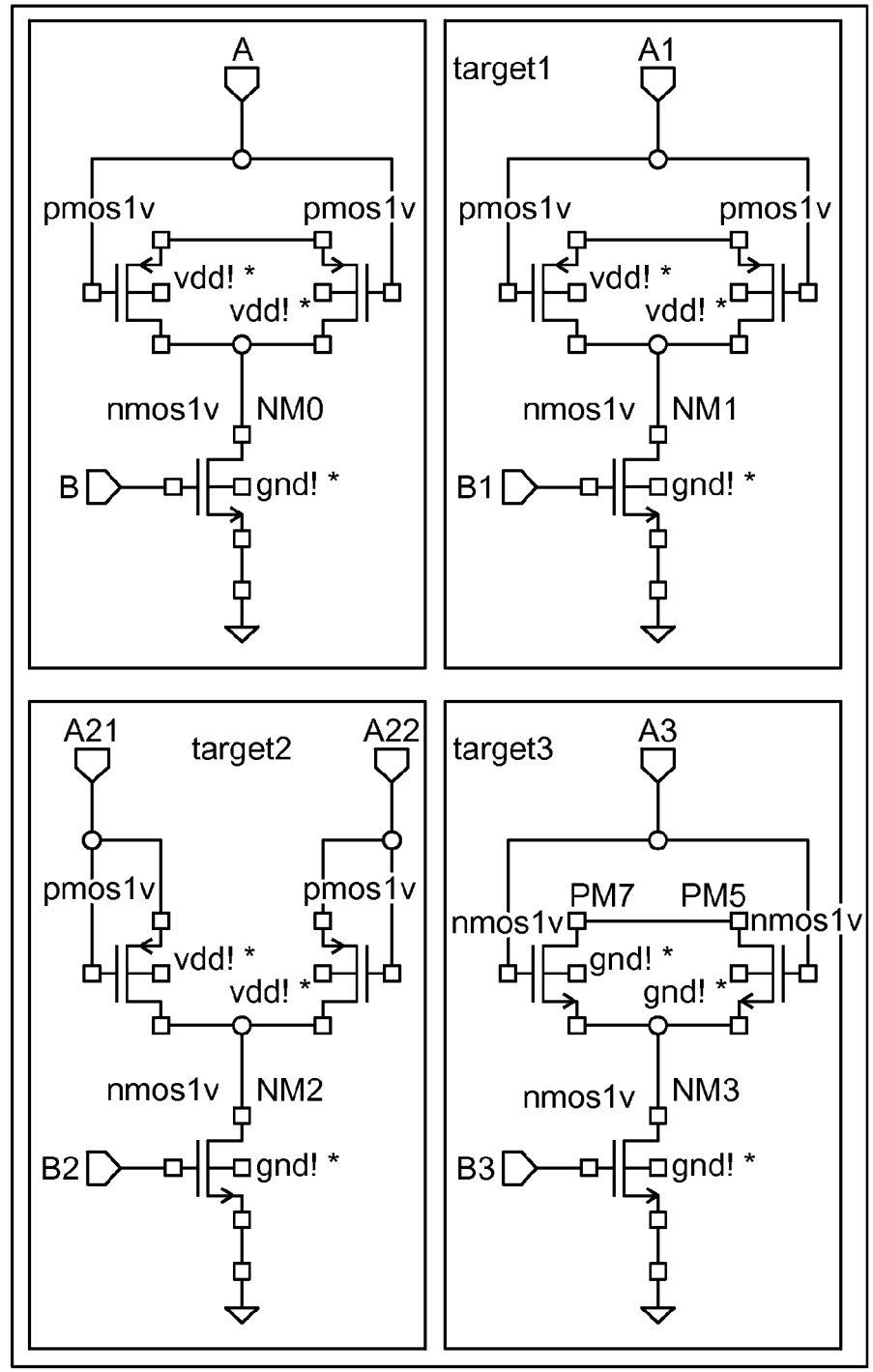
FIG. 3 graphically illustrates the application of a clone search process to identify target root devices that match a clone source.

FIG. 3 graphically illustrates the application of a clone search process to identify target devices that match a clone source. The clone connectivity search is performed to identify "target1" as a clone of the clone source. In some embodiments where the method or system may also identify mutants in the query results, the method or system may perform the mutant connectivity search to identify "target2" as a mutant with two connectivity differences. In "target2", the top pmos (p-channel metal-oxide-semiconductor field effect transistor) drain and gate are not connected together. It shall be noted that target3 is identified neither as a clone nor as a mutant because the device masters do not match (three nmos instead of two pmos and one nmos in this example illustrated in FIG. 3).

Figure 4:
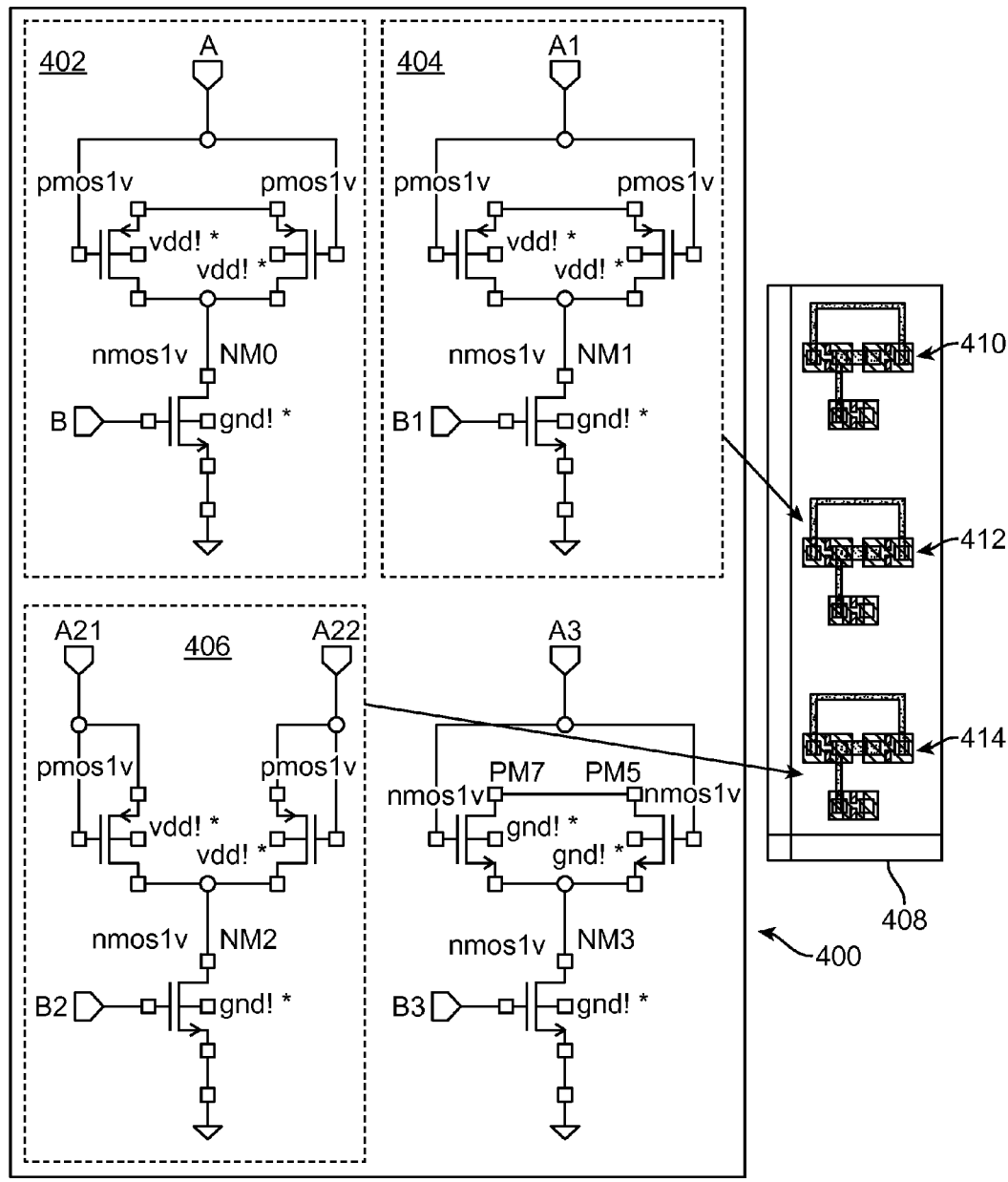
FIG. 4 graphically illustrates that the method or system identifies or generates multiple targets in a layout in some embodiments.

FIG. 4 graphically illustrates that the method or system identifies or generates multiple targets in a layout in some embodiments. More specifically, the method or system may identify or generate one or more targets in a schematic and/or a layout from a copy of the layout clone source with the connectivity and names from the schematic clone and mutant targets. For example, given the clone source 402 in the schematic 400, the clone target 404 and a mutant target 406 in the schematic 400 may also be identified with the connectivity and identifications accordingly. In the layout 408 including the layout instance 410 corresponding to the clone source 402, the layout instances 412 and 414 may also be identified or generated in accordance with the clone target 404 and the mutant target 406.

System Architecture Overview

Figure 15:
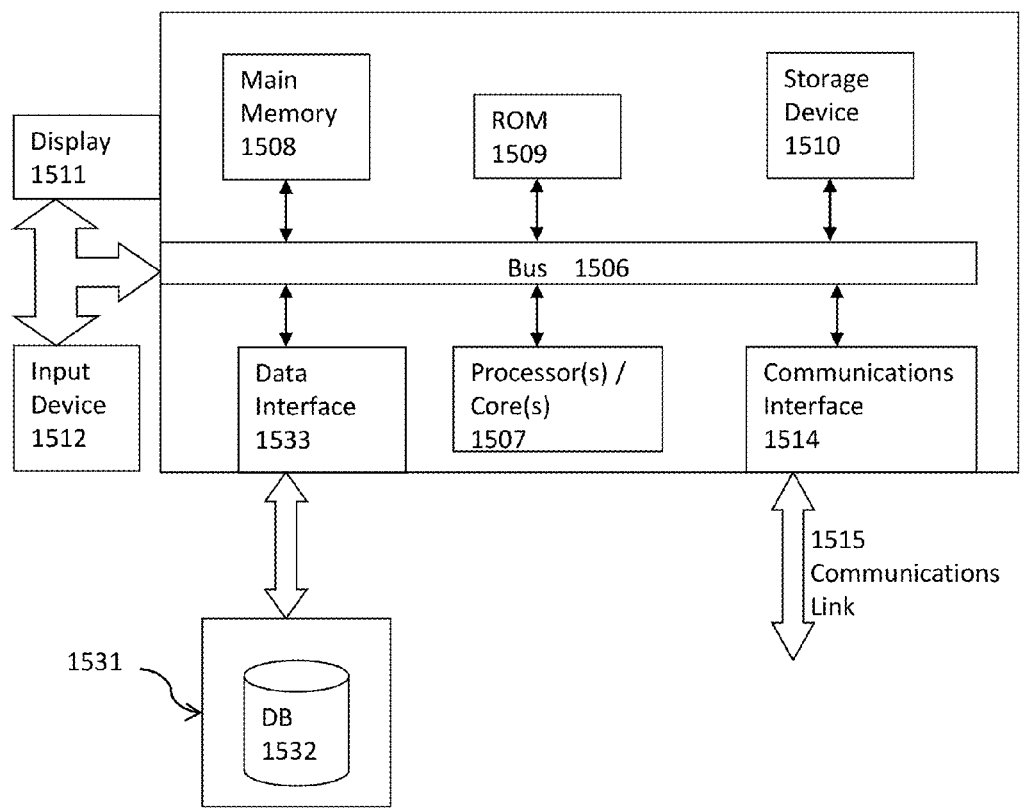
FIG. 15 illustrates a computerized system on which a method for implementing electronic designs with cloning techniques may be implemented.

FIG. 15 illustrates a block diagram of an illustrative computing system 1500 suitable for implementing electronic designs with cloning techniques as described in the preceding paragraphs with reference to various figures. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control (not shown).

According to one embodiment, computer system 1500 performs specific operations by one or more processor or processor cores 1507 executing one or more sequences of one or more instructions contained in system memory 1508. Such instructions may be read into system memory 1508 from another computer readable/usable storage medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 1507, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1515 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. In an embodiment, the computer system 1500 operates in conjunction with a data storage system 1531, e.g., a data storage system 1531 that contains a database 1532 that is readily accessible by the computer system 1500. The computer system 1500 communicates with the data storage system 1531 through a data interface 1533. A data interface 1533, which is coupled to the bus 1506, transmits and receives electrical, electromagnetic or optical signals that include data streams representing various types of signal information, e.g., instructions, messages and data. In embodiments of the invention, the functions of the data interface 1533 may be performed by the communication interface 1514.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing electronic designs with cloning techniques, comprising:
   using at least one processor or at least one processor core to perform a process the process comprising:
   identifying a root device corresponding to a master design in an electronic design for approximate or exact replication of the root device in the electronic design;
   performing one or more sets of searches for device correspondence with respect to the root device; and
   implementing the electronic design by at least characterizing the device correspondence based at least in part upon one or more criteria for the one or more sets of searches.

2. The computer implemented method of claim 1, wherein the act of implementing the electronic design by at least characterizing the device correspondence comprises:
   determining whether the device correspondence represents a clone, a mutant, or a user clone.

3. The computer implemented method of claim 1, the process further comprising:
   identifying one or more master designs in the electronic design;
   identifying the master design from the one or more master designs based at least in part upon one or more factors including a number of occurrences of the master design in the electronic design; and
   identifying a plurality of devices that correspond to the master design as a plurality of potential root devices.

4. The computer implemented method of claim 3, the process further comprising:
   identifying a potential root device from the plurality of potential root devices as the root device; and
   identifying a set of bounding boxes for the root device at clone source locations.

5. The computer implemented method of claim 1, the process further comprising:
   identifying one or more target devices that are similar to the root device as one or more target root devices;
   identifying a target root device from the one or more target root devices; and
   determining a corresponding set of target bounding boxes for the target root device.

6. The computer implemented method of claim 5, the act of determining the corresponding set of target bounding boxes for the target root device comprising:
   performing a transformation on the set of bounding boxes for the root device from the root device to the target root device; and determining the corresponding set of target bounding boxes based at least in part upon one or more sizes of the set of bounding boxes and the transformation.

7. The computer implemented method of claim 5, the process further comprising:
identifying a first set of searches from the one or more searches; and
performing the first set of searches on the corresponding set of bounding boxes for the target root device for the device correspondence.

8. The computer implemented method of claim 1, further comprising:
determining whether a first set of searches of the one or more returns sufficient information to determine the device correspondence; and
identifying one or more next sets of searches based at least in part upon the first set of searches, wherein the first set of searches does not return the sufficient information to determine the device correspondence.

9. The computer implemented method of claim 8, wherein the act of identifying the one or more next sets of searches comprises:
identifying search locations for the first set of searches for a target root device;
performing one or more transformations on the search locations with respect to the target root device; and
determining the one or more next sets of searches based at least in part upon respective results of performing the one or more transformations.

10. The computer implemented method of claim 1, the process further comprising:
determining whether the one or more sets of searches return sufficient information for the device correspondence; and
performing one or more additional sets of searches for the device correspondence with respect to the root device when the one or more sets of searches fails to return the sufficient information for the device correspondence.

11. The computer implemented method of claim 1, the process further comprising:
identifying a first target root device with respect to which the one or more searches are performed;
determining whether the one or more sets of searches performed for the first target root device return sufficient information for the device correspondence; and
identifying a second target root device for the one or more sets of searches.

12. The computer implemented method of claim 1, the processing further comprising:
identifying the device correspondence between the root device and a target root device from results of performing the one or more sets of searches; and
determining whether the device correspondence represents a clone, a mutant, or a user clone.

13. The computer implemented method of claim 1, the process further comprising:
identifying one or more options for connectivity; and
performing connectivity check to determine whether the device correspondence is to be accepted or rejected.

14. The computer implemented method of claim 1, wherein the one or more criterion includes whether the one or more sets of searches are to identify a clone, a mutant, or a user clone, and the act of implementing the electronic design comprises identifying or replicating a clone source including the root device as the clone, the mutant, or the user clone, without performing connectivity search.

15. A system for implementing electronic designs with cloning techniques, comprising:
non-transitory memory storing thereupon computer code;
at least one processor or at least one processor core that executes the computer code to identify a root device corresponding to a master design in an electronic design for approximate or exact replication of the root device in the electronic design, perform one or more sets of searches for device correspondence with respect to the root device, and implement the electronic design by at least characterizing the device correspondence based at least in part upon one or more criteria for the one or more sets of searches.

16. The system of claim 15, wherein the at least one processor or at least one processor core further executes the computer code to identify one or more master designs in the electronic design, identify the master design from the one or more master designs based at least in part upon one or more factors including a number of occurrences of the master design in the electronic design, identify a plurality of devices that correspond to the master design as a plurality of potential root devices, identify a potential root device from the plurality of potential root devices as the root device, and identify a set of bounding boxes for the root device at clone source locations.

17. The system of claim 15, wherein the one or more criterion includes whether the one or more sets of searches are to identify a clone, a mutant, or a user clone, and the act of implementing the electronic design comprises identifying or replicating a clone source including the root device as the clone, the mutant, or the user clone, without performing connectivity search.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a process for implementing electronic designs with cloning techniques, the process comprising:
identifying a root device corresponding to a master design in an electronic design for approximate or exact replication of the root device in the electronic design;
performing one or more sets of searches for device correspondence with respect to the root device; and
implementing the electronic design by at least characterizing the device correspondence based at least in part upon one or more criteria for the one or more sets of searches.

19. The article of manufacture of claim 18, the process further comprising:
identifying one or more master designs in the electronic design;
identifying the master design from the one or more master designs based at least in part upon one or more factors including a number of occurrences of the master design in the electronic design;
identifying a plurality of devices that correspond to the master design as a plurality of potential root devices;
identifying a potential root device from the plurality of potential root devices as the root device; and
identifying a set of bounding boxes for the root device at clone source locations.

20. The article of manufacture of claim 18, wherein the one or more criterion includes whether the one or more sets of searches are to identify a clone, a mutant, or a user clone, and the act of implementing the electronic design comprises identifying or replicating a clone source including the root device as the clone, the mutant, or the user clone, without performing connectivity search.

* * * * *